United States Patent
Jiang

(10) Patent No.: US 10,701,465 B2
(45) Date of Patent: Jun. 30, 2020

(54) WIDE PASSBAND WAVELENGTH SELECTIVE SWITCH

(71) Applicant: Zhiping Jiang, Kanata (CA)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/173,377

(22) Filed: Oct. 29, 2018

(65) Prior Publication Data

US 2019/0149897 A1 May 16, 2019

Related U.S. Application Data

(60) Provisional application No. 62/584,532, filed on Nov. 10, 2017.

(51) Int. Cl.
*H04Q 11/00* (2006.01)
*G02B 6/35* (2006.01)
*G02B 6/38* (2006.01)
*H04J 14/02* (2006.01)

(52) U.S. Cl.
CPC ......... *H04Q 11/0005* (2013.01); *G02B 6/356* (2013.01); *G02B 6/3846* (2013.01); *H04J 14/0212* (2013.01); *H04Q 2011/0016* (2013.01); *H04Q 2011/0026* (2013.01); *H04Q 2011/0049* (2013.01)

(58) Field of Classification Search
None
See application file for complete search history.

(56) References Cited

U.S. PATENT DOCUMENTS

| | | | |
|---|---|---|---|
| 8,867,917 B2 | 10/2014 | Frisken et al. | |
| 2010/0129076 A1 | 5/2010 | Barbarossa | |
| 2016/0315697 A1 | 10/2016 | Breukelaar et al. | |
| 2016/0316281 A1* | 10/2016 | Keyworth | H04J 14/0212 |
| 2017/0255078 A1 | 9/2017 | Jiang | |
| 2019/0064437 A1 | 2/2019 | Matsuyama et al. | |

FOREIGN PATENT DOCUMENTS

CN 102292667 A 12/2011
EP 2570830 A2 3/2013
(Continued)

OTHER PUBLICATIONS

Rahman, Talha, et al. On the Mitigation of Optical Filtering Penalties Originating from ROADM Cascade, IEEE Photonics Technology Letters, Jan. 15, 2014, pp. 154-157, vol. 26, No. 2.
(Continued)

*Primary Examiner* — Omar R Rojas

(57) ABSTRACT

Methods and apparatus are provided that configure a wider passband for one or more channels of a wavelength selective switch (WSS). When a wider passband route WSS and a normal width passband select switch are used in combination, crosstalk that may be introduced by the wider passband route WSS can be mitigated. The wider passband WSS can provide a passband that allows a maximum bandwidth of signal to pass on a given channel and avoid signal being attenuated at the channel edges, especially when channels have a reduced channel spacing, such as with 50 GHz spacing.

21 Claims, 18 Drawing Sheets

(56) References Cited

FOREIGN PATENT DOCUMENTS

| WO | 2014027204 A1 | 2/2014 |
| WO | 2017150278 A1 | 9/2017 |

OTHER PUBLICATIONS

JDS Uniphase Corporation, White Paper: A Performance Comparison of WSS Switch Engine Technologies; May 2009, pp. 1-24.
Schroder, Jochen et al., An optical FPGA: Reconfigurable simultaneous multi-output spectral pulse-shaping for inear optical processing; Optics Express 690, Jan. 7, 2013, pp. 690-697, vol. 21, No. 1.

* cited by examiner

WIDE PASSBAND WAVELENGTH SELECTIVE SWITCH

CROSS REFERENCE TO RELATED APPLICATIONS

This application claims the benefit of priority to U.S. Provisional Patent Application Ser. No. 62/584,532 filed Nov. 10, 2017 and entitled "Wide Passband Wavelength Selective Switch" the contents of which are incorporated herein by reference.

FIELD OF THE APPLICATION

The application relates generally to optical communication network devices and in particular, embodiments related to wavelength selective switches.

BACKGROUND

Optical networks are employed to support the demand for high-speed, high-capacity advanced telecommunications and data networks. These optical networks commonly utilize optical dense wavelength division multiplexing (DWDM) to exploit the available optical spectrum. In optical DWDM, data is modulated onto several different carrier waves of different wavelengths, commonly referred to as channels or channel wavelengths.

Many optical networks employ optical nodes that occur at branch points of the optical network. Often, these nodes employ Reconfigurable Optical Add Drop Multiplexer (ROADM) devices that allow for the removal or addition of one or more channel wavelengths at a node.

In order to realize a ROADM device, a wavelength selective switch (WSS) may be employed for the routing of the channel wavelengths. In many WSS architectures, an optical deflection device, such as a liquid crystal on silicon (LCoS) phased array switching engine, may be used to select a channel wavelength for routing to a desired output port of the WSS. For example, routing of a channel wavelength of a DWDM signal to a drop port results in that channel wavelength being dropped from the incoming DWDM signal.

In current and future optical networks, a signal baud rate may be set very close to channel spacing so as to improve (and possibly maximize) spectral efficiency. Due to this close association, there is the potential of loss of signal information unless the passband of the channel can be maximized, while at the same time being careful to minimize crosstalk from adjacent channels.

SUMMARY

One broad aspect of the present disclosure provides a method and apparatus that obviates or mitigates one of the disadvantages of the prior art.

In a first aspect of the present invention, there is provided a method for providing wider channel passband for a wavelength selective switch. The method comprises spatially separating an optical signal comprising two adjacent wavelength channels onto an optical deflector array comprising a plurality of deflection elements, each wavelength channel defined on the optical deflector array by a common wavelength channel region; modifying deflection elements in a first area of the optical deflector array to deflect a first wavelength channel portion of the first wavelength channel to a first output port, the first area including deflection elements from a first portion of the common wavelength channel region of the first wavelength channel and from a first portion of the common wavelength channel region of the second wavelength channel; and modifying deflection elements in a second area of the optical deflector array to deflect a second wavelength channel portion of the second wavelength channel to a second output port, the second area including deflection elements from a second portion of the common wavelength channel region of the second wavelength channel and from a second portion of the common wavelength channel region of the first wavelength channel.

In an embodiment of the first aspect, the multiplexing WSS has a first output port and a second output port that are the same output port, and the demultiplexing WSS has first and second output ports that are different output ports. In another embodiment, the method further comprises receiving the optical signal at an input port; spatially separating the two adjacent wavelength channels of the optical signal; and directing the two spatially separated adjacent wavelength channels onto the optical deflector array so that each wavelength channel is incident on its respective common wavelength channel region of the optical deflector array. In a further embodiment, there is a third wavelength channel adjacent the second wavelength channel, and the method further comprises modifying deflection elements in a third area of the optical deflector array to deflect a first wavelength channel portion of a third wavelength channel to a third output port, the third area including deflection elements from a first portion of the common wavelength channel region of the third wavelength channel and from a first portion of the common wavelength channel region of the second wavelength channel; and modifying deflection elements in the second area of the optical deflector array, the second area also including deflection elements from a second portion of the common wavelength channel region of the third wavelength channel.

In another embodiment the deflection elements are arranged in a two dimensional lattice; and the step of controlling the optical deflector array comprises controlling phase shift profiles of the deflection elements in the first and second areas of the optical deflector array. In an embodiment, controlling phase shift profiles of the deflection elements in the first and second areas of the optical deflector array comprises controlling the optical deflector array so that deflection elements in the first area of the optical deflector array have a first phase shift profile; and so that deflection elements in the second area of the optical deflector array have a second phase shift profile. In a further embodiment, the two dimensional lattice of deflection elements extends in a first direction along a wavelength dispersion axis and in a second direction along a second axis perpendicular to the wavelength dispersion axis; and he phase shift profiles are along the direction of the second axis. In yet a further embodiment, the common wavelength channel region of each wavelength channel comprises a predefined number of columns of deflection elements in the first direction that collectively correspond to a predefined bandwidth. IN a further embodiment a first portion of the common wavelength channel region of the second wavelength channel includes n columns of deflection elements in the first direction, where n is an integer number ≤10% of the predefined number of deflection elements in the common wavelength channel region of the first wavelength channel; and a second portion of the common wavelength channel region of the first wavelength channel includes m columns of deflection elements in the first direction, where m is an integer number ≤10% of the predefined number of deflection elements in the common wavelength channel region of the second wavelength channel. In another further embodiment the optical deflector array is a liquid crystal on silicon (LCoS) pixel array.

In a further embodiment, the method further comprises modifying deflection elements in a first wavelength channel portion of the second wavelength channel to a first monitoring output port; and modifying deflection elements in a second wavelength channel portion of the first wavelength channel to a second monitoring port.

In a second aspect of the present invention, there is provided a method of providing a wider channel passband for a wavelength selective switch. The method comprises spatially separating a first optical signal comprising at least one first wavelength channel onto an optical deflector array comprising a plurality of deflection elements, each wavelength channel defined on the optical deflector array by a common wavelength channel region; spatially separating a second optical signal comprising two adjacent wavelength channels onto the optical deflector array, wherein one wavelength channel of the two adjacent wavelength channels is the same as one of the at least one first wavelength channel of the first optical signal and the adjacent wavelength channel of the two adjacent wavelength channels is different than any of the at least one first wavelength channels of the first optical signal; modifying deflection elements in a first area of the optical deflector array to deflect a first wavelength channel portion of the first wavelength channel to an output port, the first area including deflection elements from a first portion of the common wavelength channel region of the first wavelength channel and from a first portion of the common wavelength channel region of a second wavelength channel; and modifying deflection elements in a second area of the optical deflector array configured to deflect a second wavelength channel portion of the second wavelength channel to the output port, the second area including deflection elements from a second portion of the common wavelength channel region of the second wavelength channel and from a second portion of the common wavelength channel region of a third wavelength channel.

In a third aspect of the present invention, there is provided an apparatus comprising at least one output port, an optical deflector array and a controller. The optical deflector array comprises a plurality of deflection elements configured to receive incident thereupon at least one spatially separated optical signal comprising two adjacent wavelength channels, each wavelength channel being incident on a respective common wavelength channel region of the optical deflector array. The controller is operatively coupled to the optical deflector array and configured to control the optical deflector array in order to: modify deflection elements in a first area of the optical deflector array to deflect a first wavelength channel portion of the first wavelength channel to a first output port, the first area including deflection elements from a first portion of the common wavelength channel region of the first wavelength channel and from a first portion of the common wavelength channel region of the second wavelength channel; and modify deflection elements in a second area of the optical deflector array configured to deflect a second wavelength channel portion of the second wavelength channel to a second output port, the second area including deflection elements from a second portion of the common wavelength channel region of the second wavelength channel and from a second portion of the common wavelength channel region of the first wavelength channel.

In an embodiment of the third aspect of the present invention, the first output port and the second output port of a multiplexing apparatus are the same output port; and the first output port and the second output port of a demultiplexing apparatus are different output ports. In another embodiment, the apparatus further comprises an input port to receive the optical signal; and optics located between the input port and the optical deflector array and configured to: spatially separate the two adjacent wavelength channels of the optical signal; and direct the two spatially separated adjacent wavelength channels onto the optical deflector array so that each wavelength channel is incident on its respective common wavelength channel region of the optical deflector array.

In another embodiment, the deflection elements are arranged in a two dimensional lattice and the controller is configured to control the optical deflector array by controlling phase shift profiles of the deflection elements in the first and second areas of the optical deflector array. In a further embodiment, the controller is configured to control phase shift profiles of deflection elements in the first and second areas of the optical deflector array so that deflection elements in the first area of the optical deflector array have a first phase shift profile; and so that deflection elements in the second area of the optical deflector array have a second phase shift profile. In a further embodiment, the two dimensional lattice of deflection elements extends in a first direction along a wavelength dispersion axis and in a second direction along a second axis perpendicular to the wavelength dispersion axis; and the phase shift profiles are along the direction of the second axis. In another further embodiment, the optical deflector array is a liquid crystal on silicon (LCoS) pixel array.

In a fourth aspect of the present invention, there is provided a wavelength selective switch that comprises the apparatus provided by the third aspect and any of the embodiments of the third aspect.

In an embodiment of the fourth aspect of the present invention, for a N×1 multiplexing switch, there are N such apparatuses, one for each of N input ports, and the N deflector arrays are configured to each deflect to a common output port. In another embodiment, for a 1×N demultiplexing switch, there are N such apparatuses, one for each of N output ports, and the N deflector arrays are configured to deflect to at least one of the output ports.

BRIEF DESCRIPTION OF THE DRAWINGS

Embodiments will now be described with reference to the attached drawings in which.

DETAILED DESCRIPTION OF EMBODIMENTS

Wavelength selective switches (WSSs) are used in DWDM systems. Embodiments of the present disclosure can be incorporated in a WSS.

A DWDM optical network supports a plurality of wavelength-multiplexed optical channels with central wavelengths $\lambda_i$, i=1, . . . , N, wherein N is an integer value. These optical channels are typically spaced uniformly in frequency and lie on a predefined grid, for example corresponding to 50 GHz, 100 GHz or 200 GHz frequency spacing. In this context, wavelength channels will be referred to according to the channel central wavelengths Ai. It is also noted that the number N of wavelength channels in the network may be implementation specific, with typical examples being in the range of 40 to 96 channels. However, it will be appreciated that a uniform frequency spacing of wavelengths channels is not a requirement for the present disclosure. For example, embodiments are contemplated that support flex-grid compatibility, where at least one of channel bandwidths and spacings may be one or both of non-uniform and adaptable.

Figure 1:
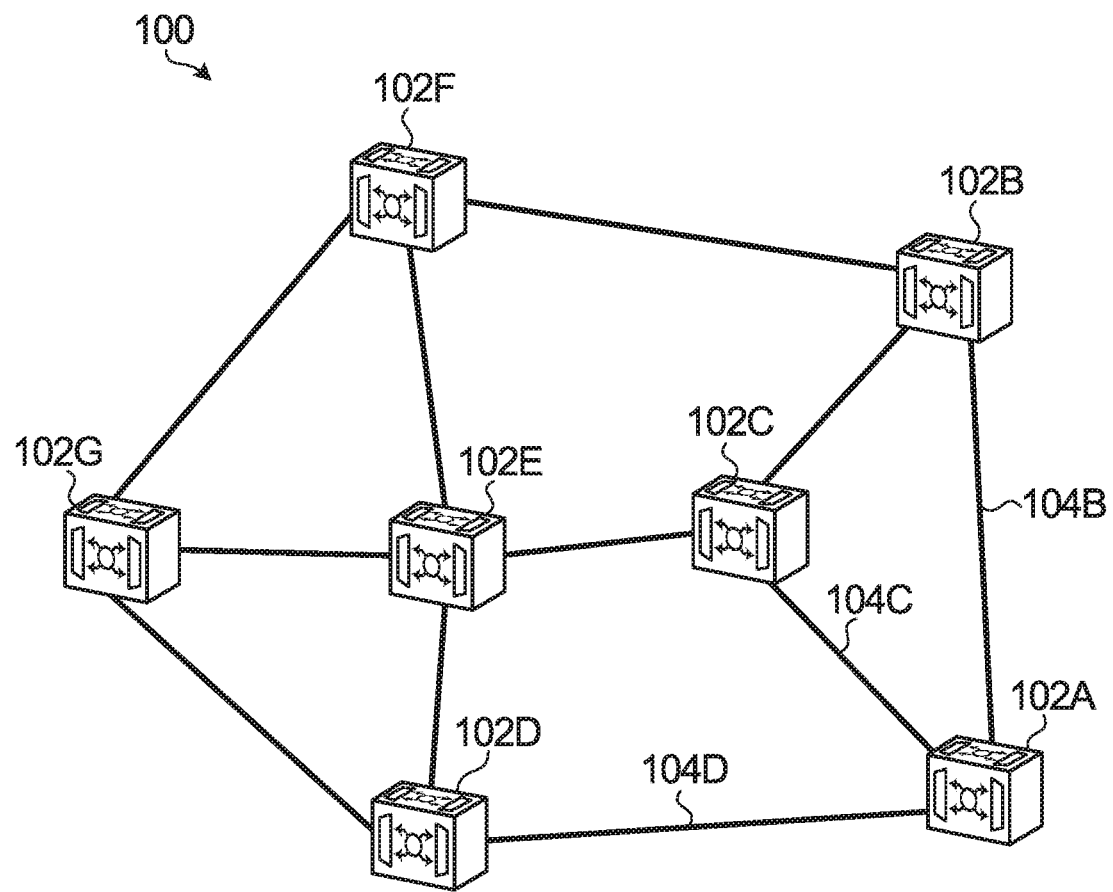
FIG. 1 is a block diagram of an optical network in which embodiments of the present disclosure may be implemented.

FIG. 1 is a block diagram of an example optical network 100 in which embodiments of the present disclosure could be implemented. The optical network 100 includes seven access ROADM nodes 102A, 102B, 102C, 102D, 102E, 102F and 102G that are interconnected via optical communication links as shown in FIG. 1. For example, Access ROADM node 102A is interconnected with access ROADM nodes 102B, 102C and 102D via optical communication links 104B, 104C and 104D, respectively. Because access ROADM node 102A is interconnected with three other access ROADM nodes (access ROADM nodes 102B, 102C and 102D), it may be referred to as a three-degree access ROADM node.

The optical communication links between the access ROADM nodes 102A, 102B, 102C, 102D, 102E, 102F and 102G may be optical fiber communication links, for example.

A person of ordinary skill will understand that an optical network may also include amplification nodes between access ROADM nodes, but such amplification nodes are not shown in FIG. 1 for the sake of simplicity.

Figure 2:
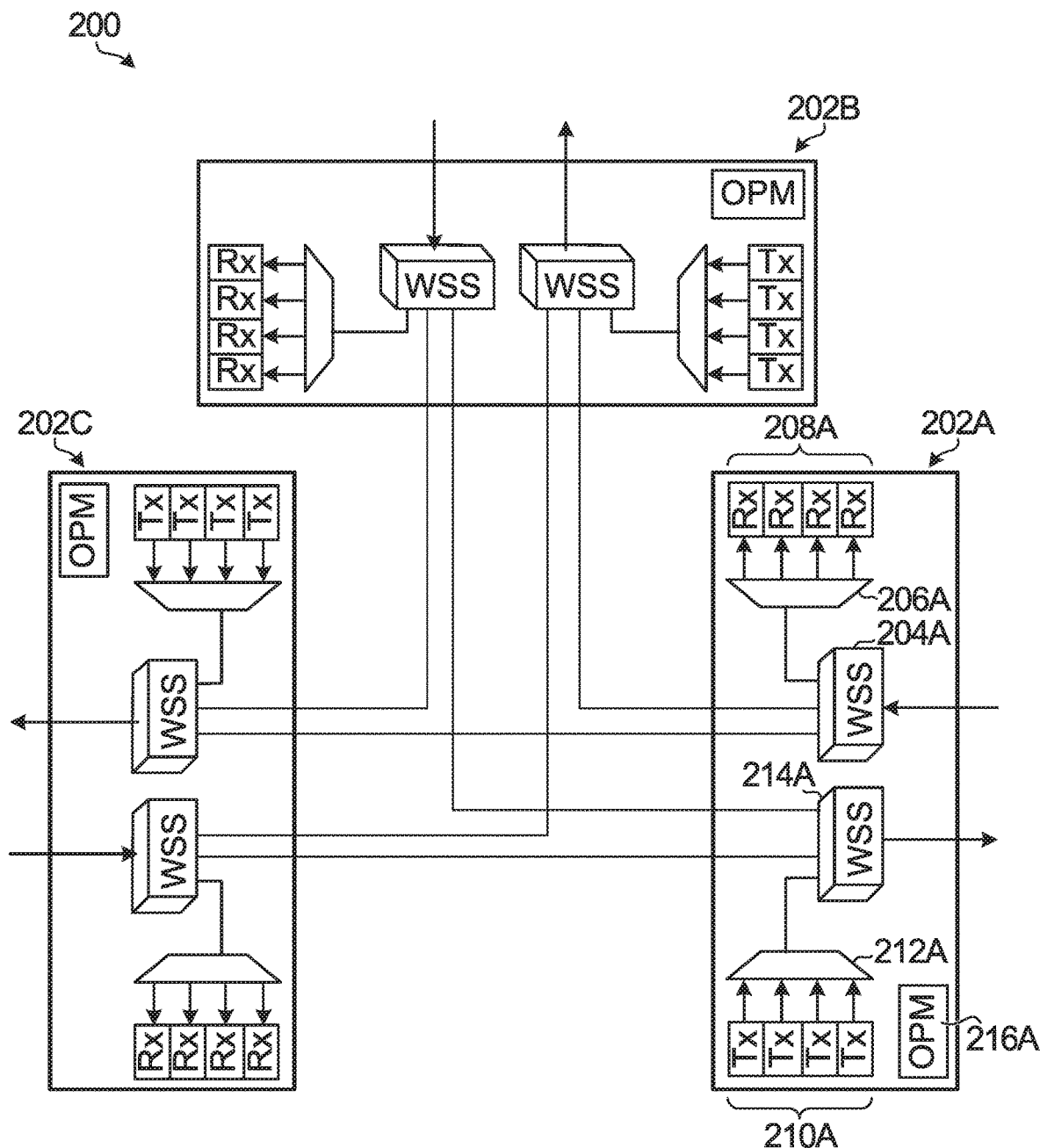
FIG. 2 is a block diagram of a three-degree ROADM node architecture in which embodiments of the present disclosure may be implemented.

FIG. 2 is a block diagram of a three-degree ROADM node architecture 200. Such a ROADM may be used in a DWDM optical network that utilizes three WSS based ROADM elements 202A, 202B and 202C, which enable selectively adding and dropping wavelengths onto and from the network and supporting traffic in three directions to communicate with three neighboring network nodes. The node architecture 200 may be used to implement the three-degree access ROADM node 102A shown in FIG. 1, for example.

The ROADM element 202A includes a WSS 204A used for dropping one or more wavelength channels of a received signal, also known as a Route WSS, a drop demultiplexer 206A, a plurality of local receivers 208A, a plurality of local transmitters 210A, an add multiplexer 212A, a WSS 214A for adding one or more wavelength channels, also known as a Select WSS, and an OPM device 216A. The ROADM elements 202B and 202C are the same as ROADM element 202A. These components are optically interconnected as shown in FIG. 2 so that traffic coming from any of the three directions can be directed to any of the other directions via an optical communication path from the Route WSS to the Select WSS, or traffic can be directed to the local receivers for the inbound direction via an optical communication path from the Route WSS of the inbound direction to the demultiplexer of the inbound direction. Traffic from the local transmitters for an outbound direction can be directed to any of the three directions via an optical communication path from the multiplexer of the outbound direction to the WSS of the outbound direction.

The OPM devices are used for optical performance monitoring at various monitoring points within the node, such as at one or both of the input port(s) and the output port(s) of the respective WSS, for example.

As will be appreciated, operating a ROADM node architecture 200 such as that illustrated in FIG. 2 generally involves configuring and controlling its constituent WSS devices, which includes controlling the configuration and adaptation of wavelength paths through the WSS device.

It is noted that the ROADM node architecture 200 shown in FIG. 2 is merely one example of a WSS based ROADM node architecture that may be used to realize a ROADM node. Other architectures (which may include variations of the illustrated architecture) are possible and are contemplated within the context of the present disclosure. In some cases, optical amplifiers may be used at least one of the input port(s) and output port(s) of the WSS ROADM elements to amplify optical signals received at an input port or transmitted from an output port. Such amplifiers may be used to compensate for at least a portion of the losses that may be incurred as an optical signal propagates through the network. Such losses may include those induced by transmission fiber or the WSS itself, for example.

It is noted that the Select WSSs shown in FIG. 2 are all 3×1 WSSs, in that they are configured to selectively switch wavelength channels from their three optical switching input ports to their single optical switching output ports. It should be understood that an architecture intended to support more (or fewer) degrees of freedom may employ different WSSs. With regard to the Route WSSs, the configuration includes one optical switching input port and multiple optical switching output ports, a 1×3 switch, where the WSS is configured to selectively switch wavelength channels from the single optical switching input port to one of its multiple optical switching output ports.

Figure 3:
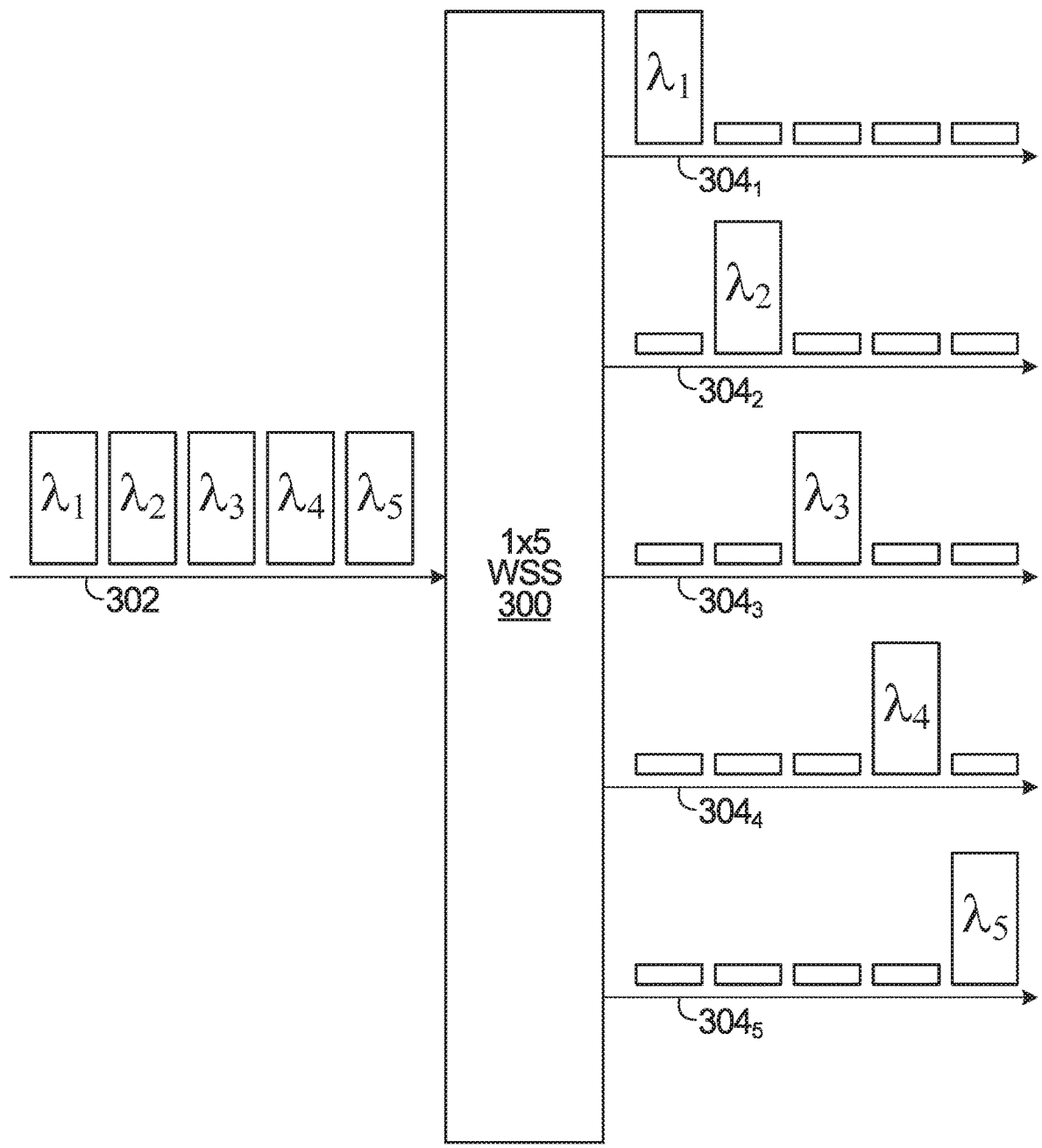
FIG. 3 is a block diagram of a 1×5 WSS.

FIG. 3 is a block diagram of an example configuration of a 1×5 WSS 300. The 1×5 WSS 300 has a single input port 302 for receiving an optical input signal comprising wavelengths channels $\lambda_1$, $\lambda_2$, $\lambda_3$, $\lambda_4$, $\lambda_5$ and five switching output ports $304_1$, $304_2$, $304_3$, $304_4$ and $304_5$. Through control signals (not shown in FIG. 3) to the WSS 300, each wavelength channel from the input signal can be dynamically switched or routed to any one or more of the output ports $304_1$, $304_2$, $304_3$, $304_4$ and $304_5$. Depending on how the WSS 300 is implemented, each wavelength channel may be dynamically routed independently of the other wavelength channels.

For illustrative purposes, in FIG. 3 the WSS 300 is shown as being configured such that each of the wavelength channels $\lambda_1$, $\lambda_2$, $\lambda_3$, $\lambda_4$, and $\lambda_5$ of the input signal is routed to a respective one of the output ports $304_1$, $304_2$, $304_3$, $304_4$ and $304_5$.

However, it should be noted that in other configurations two or more channel wavelengths may be routed to the same output port. In further configurations one or more of the channel wavelengths may be blocked or attenuated by the WSS so that they are not routed to any of the output ports.

Figure 4:
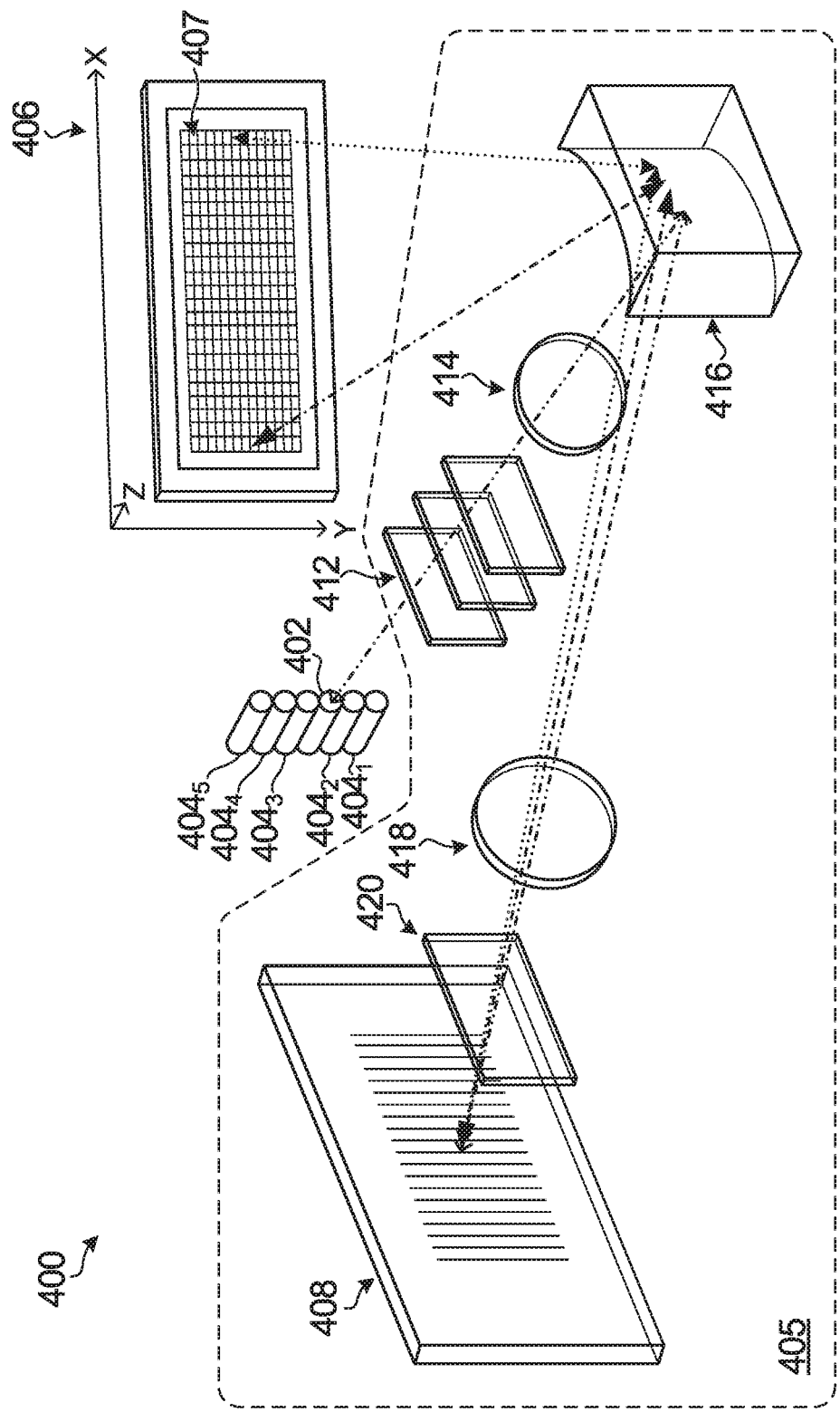
FIG. 4 is a diagram of an example of an optical deflector array based 1×5 WSS that may be utilized to implement the 1×5 WSS of FIG. 3.

Many types of WSSs are known in the art. One common type of WSS is based on an optical deflector array, sometimes referred to as a beam steering device. FIG. 4 is a diagram of an example of an optical deflector array based 1×5 WSS 400 that may be utilized to implement the 1×5 WSS 300 of FIG. 3. The optical deflector array based 1×5 WSS 400 includes one input port 402 and five output ports $404_1$, $404_2$, $404_3$, $404_4$, $404_5$, optics 405 and an optical deflector array 406.

Optics 405 serve to spatially separate different wavelength channels of an incoming optical signal from the input port 402 and direct the spatially separated wavelength channels onto the controllable optical deflector array 406, such that each spatially separated wavelength channel is incident on a respective common wavelength region of the optical deflector array 406. As will be seen in FIG. 5, for example the wavelength channel is spread in a vertical direction such that all of the light for a given channel falls with a common wavelength channel region. Each common wavelength channel region will occupy a group of vertical columns of deflection elements. It will be understood that the illustrated vertical direction is merely for exemplary purposes, and other orientations are possible. In the illustrated example, optics 405 includes polarization diversity optics 412, imaging optics 414 and 418, a cylindrical mirror 416, compensating optics 420 and a diffraction grating 408. However, a person of ordinary skill in the art will recognize that other arrangements may omit one or more of the example optical components. One skilled in the art will also recognize that other arrangements may include additional optical components. In some embodiments, additional optical components may be included while an illustrated optical component may be omitted.

The optical deflector array 406 includes a plurality of deflection, or beam steering, elements 407 arranged in a two dimensional lattice in an X-Y plane of the optical deflector array 406. The X-axis of the X-Y plane may be referred to as the wavelength dispersion axis because the optics 405 and the optical deflector array 406 are arranged such that the wavelength channels of the incoming optical signal are spatially separated along the X-axis of the optical deflector array 406.

The deflection elements 407 of the optical deflector array 406 are controllable to steer the incident wavelength channels in a programmable direction. After each wavelength channel has been steered by the optical deflector array 406, the optics 405 can re-multiplex the wavelength channels and direct them to an output port according to the steering imparted by the optical deflector array 406.

Figure 5:
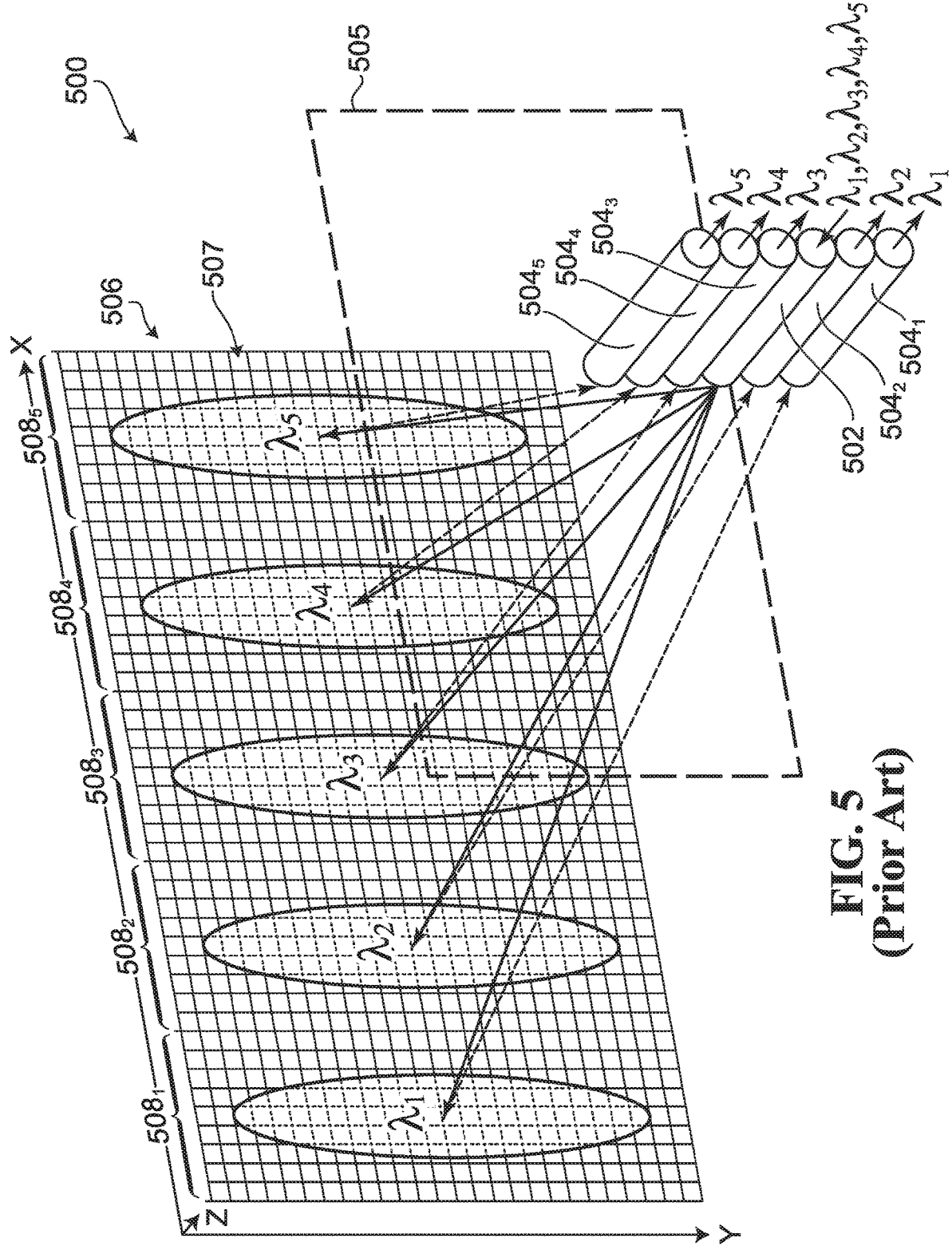
FIG. 5 is a diagram of a portion of an optical deflector array based 1×5 WSS.

FIG. 5 is a diagram of a portion of an optical deflector array based 1×5 WSS 500 showing how an optical deflector array may be configured to implement the configuration of the 1×5 WSS 300 of FIG. 3. The optical deflector array based 1×5 WSS 500 includes an input port 502 receiving an optical signal comprising wavelengths channels $\lambda_1$, $\lambda_2$, $\lambda_3$, $\lambda_4$, $\lambda_5$, five output ports $504_1$, $504_2$, $504_3$, $504_4$, and $504_5$, and an optical deflector array 506.

The wavelength channels $\lambda_1$, $\lambda_2$, $\lambda_3$, $\lambda_4$, $\lambda_5$ of the incoming optical signal from the input port 502 are spatially separated and directed onto the controllable optical deflector array 506 by optics 505 (not shown in detail), which may be similar to the optics 405 of FIG. 4. It should be understood that within the deflector array 506, a plurality of regions $508_1$, $508_2$, $508_3$, $508_4$, $508_5$ can be defined. These regions are referred to as common wavelength channel regions. Each spatially separated wavelength channel $\lambda_1$, $\lambda_2$, $\lambda_3$, $\lambda_4$, $\lambda_5$ is incident on a respective common wavelength channel region $508_1$, $508_2$, $508_3$, $508_4$, $508_5$ of the optical deflector array 506. In some embodiments, the common wavelength channel regions are designed so that they do not overlap. If the adjacent common wavelength channel regions do overlap (or if they are sufficiently close to each other) then there is the potential for crosstalk between the two channels.

The optical deflector array 506 can be controlled such that deflection elements 507 in each of the respective common wavelength channel regions $508_1$, $508_2$, $508_3$, $508_4$, $508_5$ are configured to steer the incident light in a programmable direction. In particular, the optical deflector array 506 is configured such that each of the wavelength channels $\lambda_1$, $\lambda_2$, $\lambda_3$, $\lambda_4$, and $\lambda_5$ of the input signal is steered toward a respective one of the output ports $504_1$, $504_2$, $504_3$, $504_4$ and $504_5$.

There are several different types of optical deflector arrays known in the art. Some examples of optical deflector arrays include, but are not limited to, Micro-Electro-Mechanical System (MEMS) mirror arrays and liquid crystal on silicon (LCoS) pixel arrays.

Figure 6:
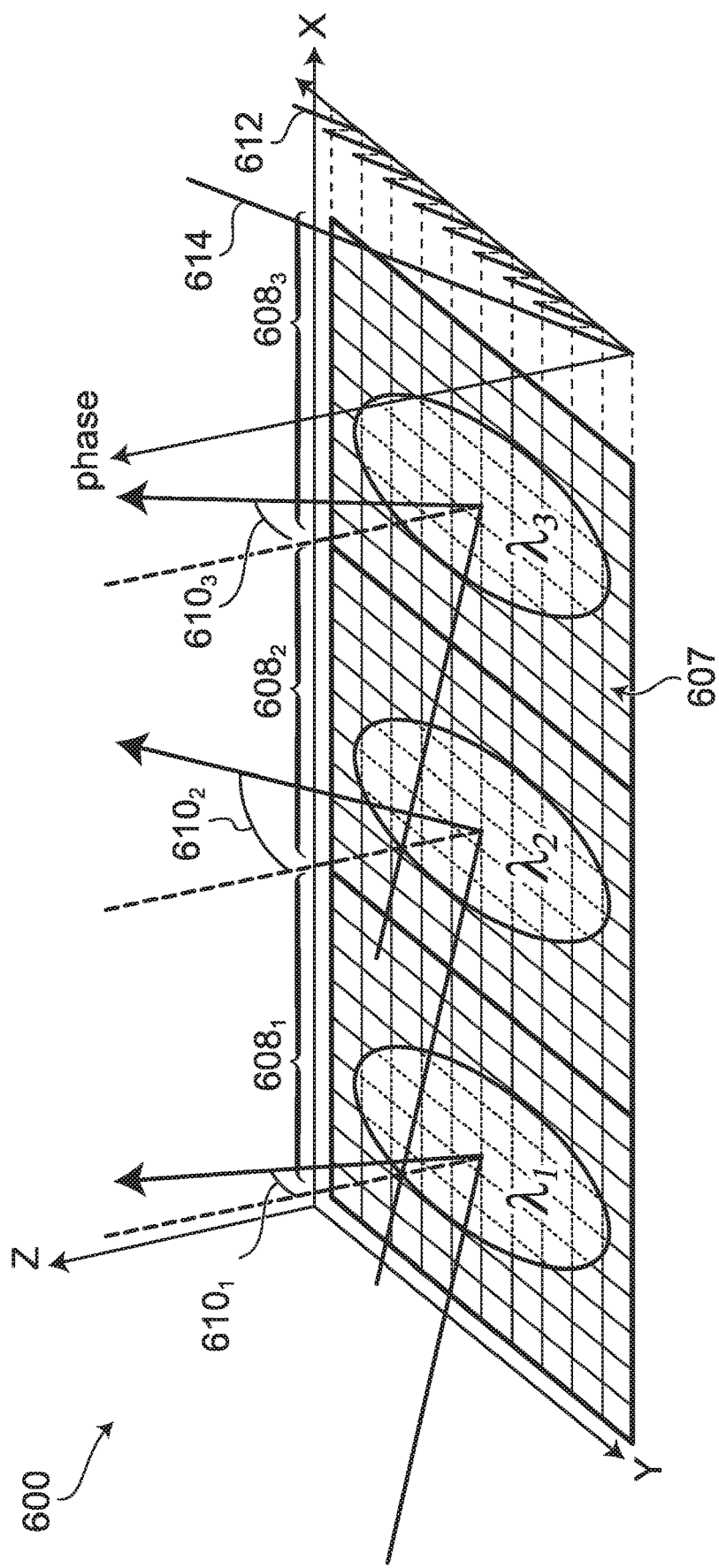
FIG. 6 is a perspective view of a portion of an optical deflector array.

FIG. 6 is a perspective view of a portion of an LCoS pixel array device 600 showing an example of how the pixels within a region of the pixel array may be controlled to steer a wavelength channel that is incident upon the region in a programmable direction.

The illustrated LCoS pixel array device 600 includes a two dimensional lattice of pixels 607 arranged in rows and columns in an X-Y plane. Each pixel can be individually drivable to provide a local phase change to an optical signal incident thereupon, thereby providing a two-dimensional array of phase manipulating regions. Manipulation of individual wavelength channels is possible once the wavelength channels of an optical signal have been spatially separated and each spatially separated wavelength channel has been directed onto a respective common wavelength channel region of the LCoS pixel array device 600. Each common wavelength channel region can be independently manipulated by driving the corresponding pixels within the region in a predetermined manner. The portion of the LCoS pixel array device 600 shown in FIG. 6 includes three common wavelength channel regions 608$_1$, 608$_2$, 608$_3$, each having a respective wavelength channel $\lambda_1, \lambda_2, \lambda_3$ incident thereupon.

Each wavelength channel $\lambda_1, \lambda_2, \lambda_3$ can be steered at a respective steering angle 610$_1$, 610$_2$, 610$_3$ from the respective common wavelength channel region 608$_1$, 608$_2$, 608$_3$ upon which it is incident. In the illustrated example, the respective steering angles are measured relative to the Z-axis which is normal to the X-Y plane. The steering angle of each common wavelength channel region can be controlled by controlling a phase shift profile of the pixels across the respective region along the direction of the Y-axis. For example, FIG. 6 includes an example of a periodic, stepped phase shift profile 612 that may be produced across the third common wavelength channel region 608$_3$ of the LCoS pixel array device 600 in the direction of the Y-axis to steer the third wavelength channel $\lambda_3$ at the intended steering angle 610$_3$. Due to the periodic nature of phase, the periodic, stepped phase shift profile 612 produces a cumulative phase profile 614 that provides a linear optical phase retardation in the direction of the intended deflection, thereby steering the third wavelength channel $\lambda_3$ at the intended steering angle 610$_3$. The cumulative phase profile 614 is produced by controlling the pixels within the third common wavelength channel region 608$_3$ to provide the desired phase shift profile 612. For example, the columns of pixels in the third common wavelength channel region 608$_3$ may be driven with a predetermined voltage profile corresponding to the desired phase shift profile 612 along the direction of the Y-axis.

Accordingly, by controlling the pixels in the third common wavelength channel region 608$_3$ to adjust the periodic, stepped phase shift profile 612, the wavelength channel $\lambda_3$ can be selectively steered toward a desired switching output port. Wavelength channels $\lambda_1, \lambda_2$ can be similarly steered by controlling the phase shift profiles of the pixels in the respective common wavelength channel regions 608$_1$, 608$_2$ upon which they are respectively incident.

As noted above, controlling a conventional WSS device to selectively route wavelength channels includes configuring wavelength paths through the WSS device from an input port of the WSS to a switching output port of the WSS for those channel wavelengths that are to be routed. However, such conventional WSS devices only permit a wavelength channel to be routed to a single output port at any given time. For example, in the conventional optical deflector based 1×5 WSS device 500 of FIG. 5, the deflection elements in each of the common wavelength channel regions 508$_1$, 508$_2$, 508$_3$, 508$_4$, 508$_5$ are each configured such that the respective wavelength channel that is incident thereupon is steered toward one and only one of the switching output ports 504$_1$, 504$_2$, 504$_3$, 504$_4$, 504$_5$.

Figure 7A:
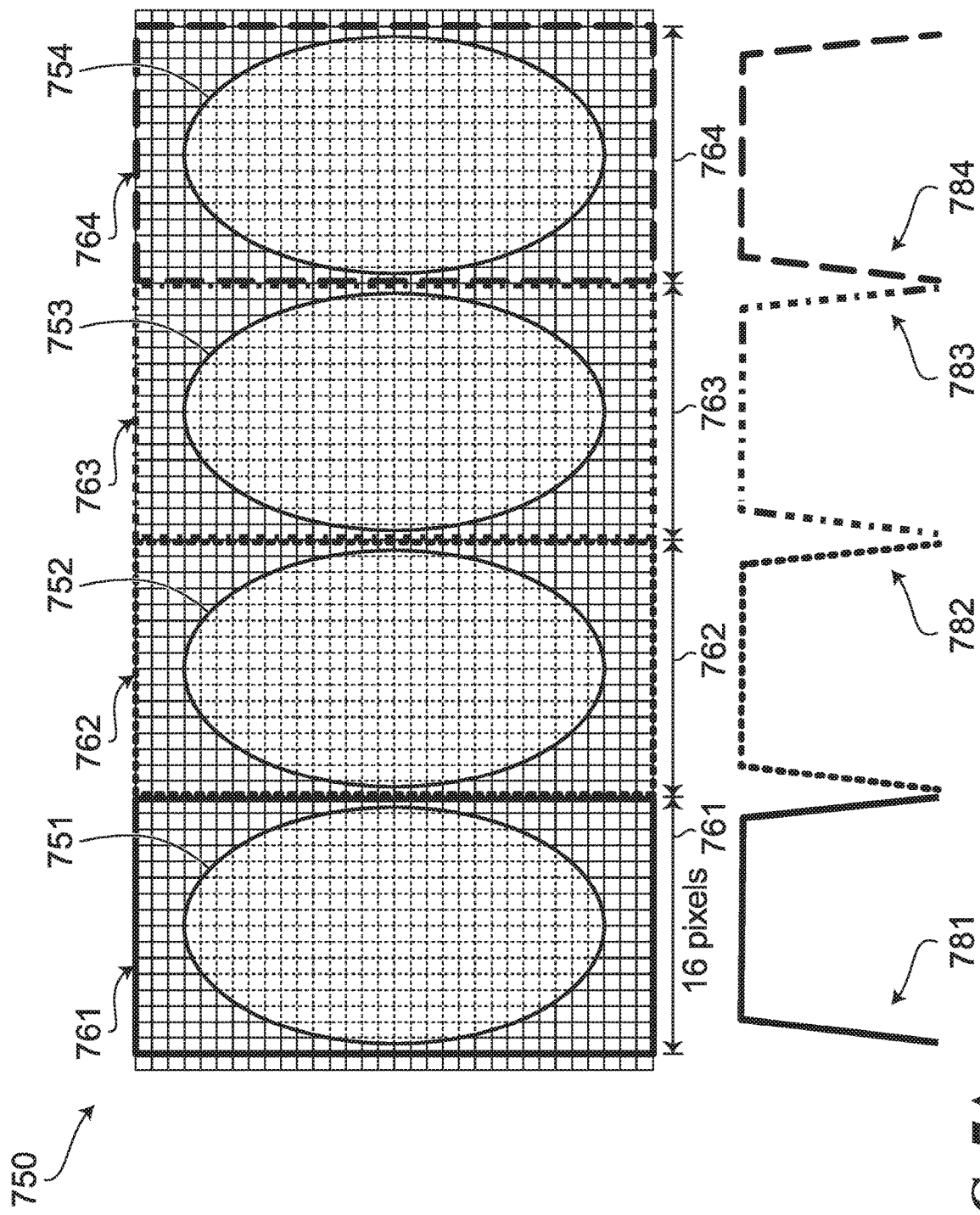
FIG. 7A is a diagram of a portion of an optical deflector array illustrating four common wavelength regions and the corresponding passbands for those channels.

FIG. 7A illustrates an example of beams of four wavelength channels 751, 752, 753, 754 incident on an optical deflector array 750 in respective common wavelength channel regions 761, 762, 763 and 764. The common wavelength channel regions are each 16 deflection elements, or pixels, wide. In a scenario in which the elements have a granularity of 6.25 GHz, the 16 element wide common wavelength channel region provides a channel bandwidth of 50 GHz. Having distinct boundaries for each common wavelength channel region ensures that crosstalk is minimized. Also included in FIG. 7A is a representative drawing of the pass band 781, 782, 783, 784 of each common wavelength channel region 761, 762, 763, 764. The high attenuation edges of the passband are substantially at the edges of the common wavelength channel regions and as a result, the passband is narrower than the 50 GHz common wavelength channel regions. Controlling the deflection elements in each respective common wavelength channel region allows the wavelength channels to switched, but the passband response ends up potentially being narrower than the optical signal of the channel.

Figure 7B:
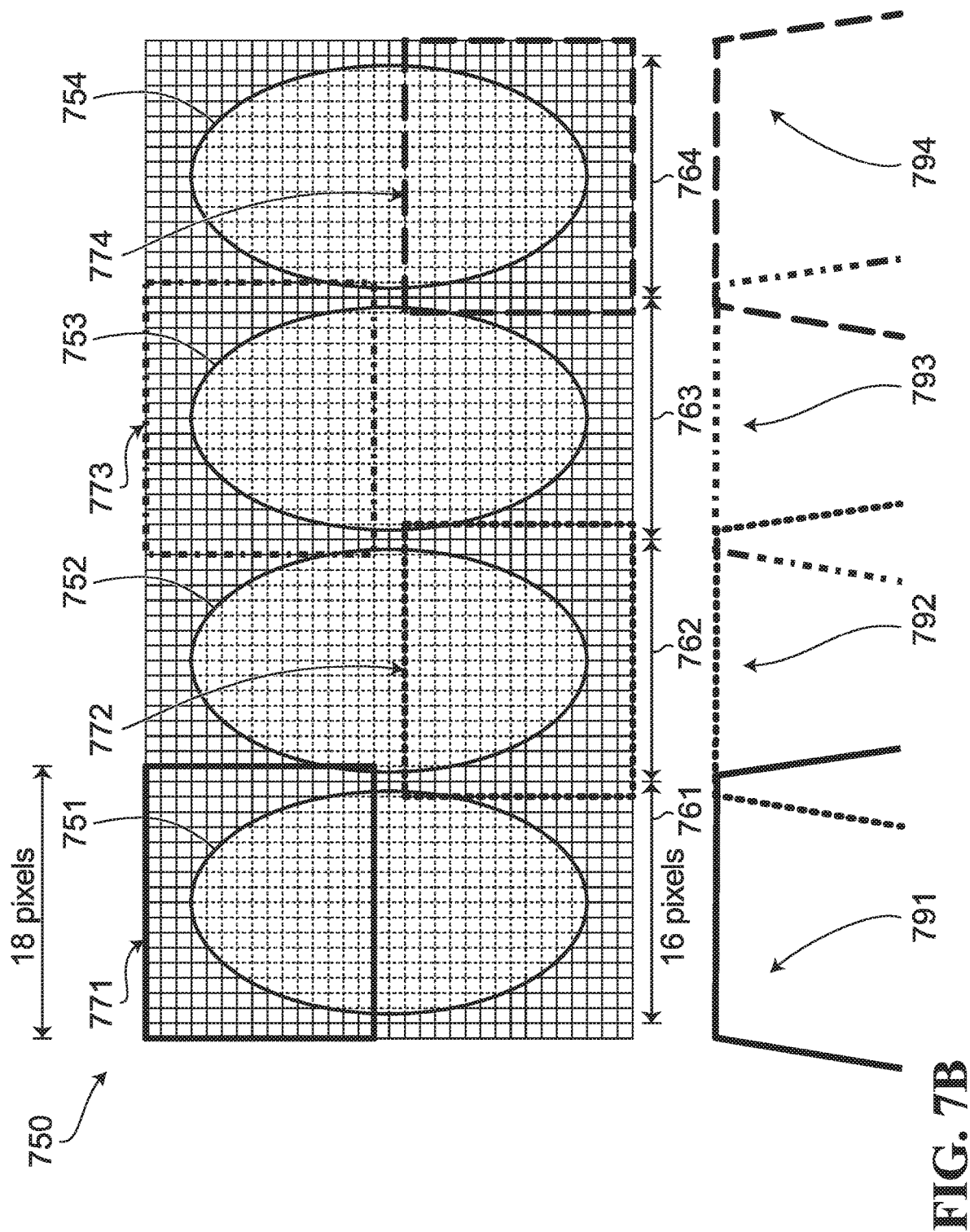
FIG. 7B is a diagram of a portion of an optical deflector array illustrating four common wavelength regions and the corresponding passbands for those channels according to an aspect of the disclosure.

FIG. 7B illustrates an example of beams of four wavelength channels 751, 752, 753, 754 incident on the deflector array 750 in respective common wavelength channel regions 761, 762, 763 and 764 having the same width as the common wavelength channel regions in FIG. 7A. However, instead of modifying all of the deflection elements of the common wavelength channel region of a wavelength channel to steer the wavelength channel to a respective output port, an alternative set of deflection elements is modified to provide a wider channel passband response for the channel of the switch. For example, for a first wavelength channel, a first area of deflection elements is modified that includes a first portion of the common wavelength channel region for the first wavelength channel and a first portion of a common wavelength channel region for one or more adjacent wavelength channels. However the first area does not overlap with a second area of deflection elements that includes a second portion of the common wavelength channel region for the first wavelength channel and a second portion of the common wavelength channel region for one or more adjacent wavelength channels.

In FIG. 7B, a first area 771 includes deflection elements of a first portion of the common wavelength channel region 761 of the first wavelength channel as well as deflection elements from a first portion of the common wavelength channel region 762 of the second wavelength channel. A second area 772 includes deflection elements of a second portion of the common wavelength channel region 762 of the second wavelength channel as well as deflection elements from a second portion of the common wavelength channel regions 761 and 763 of the first and third wavelength channels. A third area 773 includes deflection elements of a first portion of the common wavelength channel region 763 of the third wavelength channel as well as deflection elements from a first portion of the common wavelength channel regions 762 and 764 of the second and fourth wavelength channels. A fourth area 774 includes deflection elements of a second portion of the common wavelength channel region 764 of the fourth wavelength channel as well as deflection elements from a second portion of the common wavelength channel region 763 of the third wavelength channel. It can be seen that the width of the first, second, third and fourth areas, 771, 772, 773 and 774 is 18 deflection elements, or pixels, which is larger than the common wavelength channel regions associated for each wavelength channel. In this example, there is an extra vertical column of deflection elements included on each side of the common wavelength channel region for each channel. Therefore, the area of deflection elements associated with a given channel, i.e. the pass band for that wavelength channel of the WSS, includes deflection elements that are considered to be in the common wavelength channel region of an adjacent channel. For instance, second area 772 is made up of deflection elements from common wavelength channel region 762, but by including an additional column of elements to each side of common wavelength channel region 762, second area 772 now includes a row of elements from each of common wavelength channel region 761 and common wavelength channel region 763.

The wider passband of each wavelength channel when used in a Route WSS may result in increased crosstalk with an adjacent channel. However, in some implementations this is not a problem as increased crosstalk for a given channel can eventually be blocked when the channel is processed by a Select WSS that does not utilize a wider passband for the channel, but only modifies the deflection elements within a common wavelength channel region of the channel. An example of this is described below with reference to FIG. 12C.

Also included in FIG. 7B is a representative drawing of the passband response 791,792,793,794 of each common wavelength region 761,762,763,764. The high attenuation edges of the passband are beyond the edges of the common wavelength regions and as a result, the passband is wider than for only the common wavelength channel region as shown in FIG. 7A, and approaches or exceeds the entire 50 GHz.

While the common wavelength regions are shown in FIG. 7B to be 16 pixels wide and the areas allowing larger passband response are 18 pixels wide, it should be understood that these are simply example values. For a LCoS deflector array that has a granularity of 3.125 GHz per pixel, a 50 GHz channel would be comprised of 16 such pixels. Therefore, for a deflector array having a different pixel granularity, there could be a different number of pixels used to represent a 50 GHz channel. In addition, while a single column of pixels is added to each side of the common wavelength region of each of the wavelengths in FIG. 7B, the number of additional columns that could be included for a given side of the common wavelength region for a given wavelength could be more or less than one. For example, a column of deflection elements could be added to one side and not the other, or two columns could be added to each side.

Furthermore, it is to be understood that while a 50 GHz channel is described in example herein, the channel size is also implementation specific.

Figure 8A:
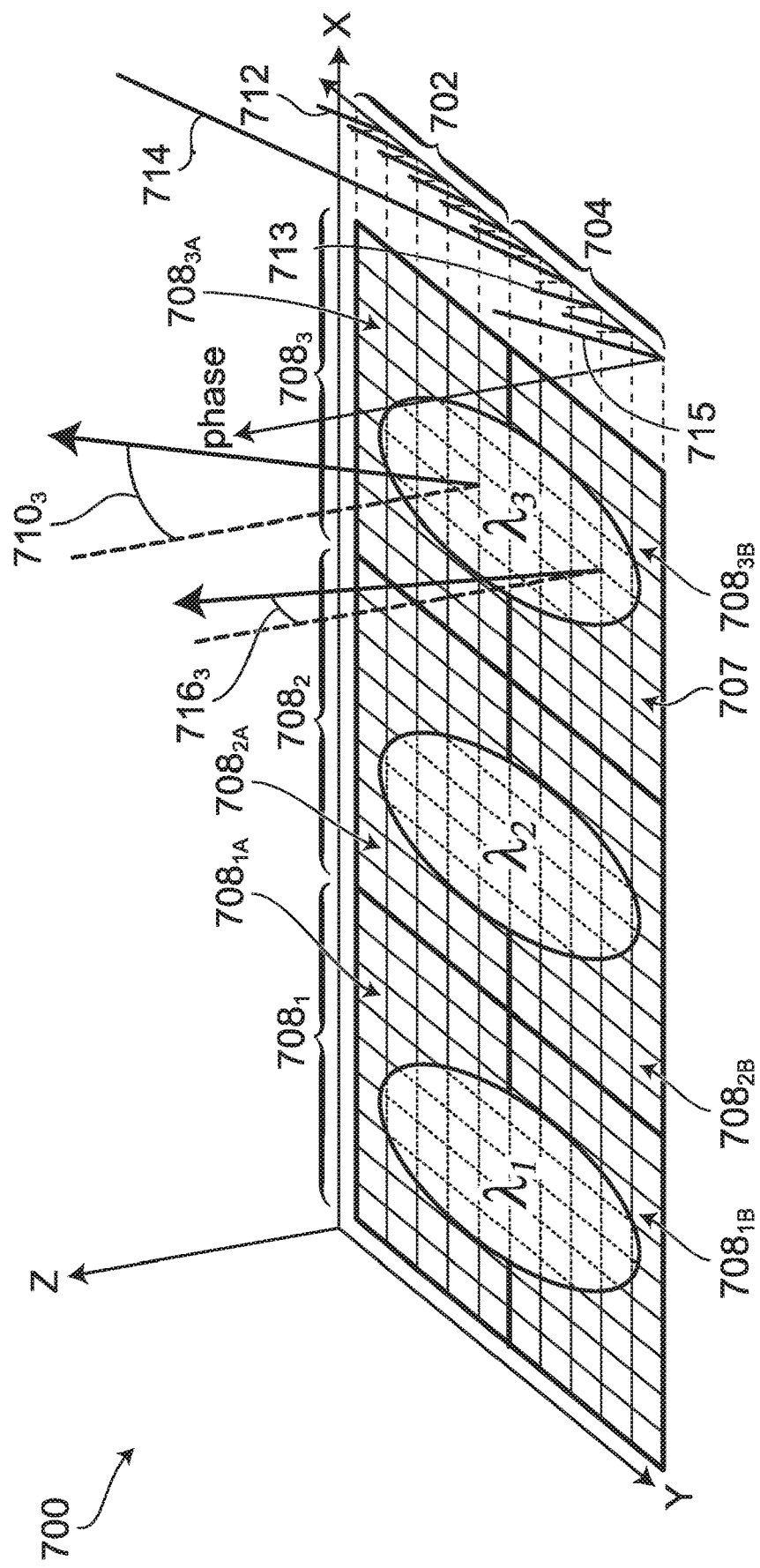
FIG. 8A is a perspective view of a portion of an optical deflector array according to an embodiment of the present disclosure.

FIG. 8A is a perspective view of a portion of an optical deflector array 700 showing an example of two different phase progressions across respective portions of a region of the array according to an embodiment of the present disclosure.

Similar to the LCoS optical deflector array 600 shown in FIG. 6, the optical deflector array 700 includes a two dimensional lattice of deflection elements 707 arranged in rows and columns in an X-Y plane and the portion of the optical deflector array 700 shown in FIG. 8A includes three common wavelength channel regions $708_1$, $708_2$, $708_3$, each having a respective wavelength channel $\lambda_1$, $\lambda_2$, $\lambda_3$ incident thereupon. However, unlike the LCoS optical deflector array 600 shown in FIG. 6, each of the three common wavelength channel regions $708_1$, $708_2$, $708_3$ has a first portion $708_{1A}$, $708_{2A}$, $708_{3A}$ and a second portion $708_{1B}$, $708_{2B}$, $708_{3B}$. As described above, the first portions $708_{1A}$, $708_{3A}$ of common wavelength channel regions $708_1$, $708_3$ include deflection elements that are configurable to steer a first wavelength portion of the wavelength channel that is incident on the common wavelength region so that the first wavelength portion of the wavelength channel can be selectively routed to a switching output port. The second portions $708_{1B}$, $708_{3B}$ of common wavelength regions $708_1$, $708_3$ include deflection elements that are either not used at all or are possibly configurable to steer the second portion of the wavelength channel that is incident on the common wavelength region so that the second wavelength portion of the wavelength channel can be selectively routed to a monitoring output port. The second portion $708_{2B}$ of common wavelength channel region $708_2$ includes deflection elements that are configurable to steer a second wavelength portion of the wavelength channel that is incident on the common wavelength region so that the second portion of the wavelength channel can be selectively routed to a switching output port. The first portion $708_{2A}$ of common wavelength region $708_2$ includes deflection elements that are either not used at all or is configurable to steer the first wavelength portion of the wavelength channel that is incident on the common wavelength region so that the first wavelength portion of the wavelength channel can be selectively routed to a monitoring output port.

For example, the deflection elements in the first portion $708_{3A}$ of the third common wavelength region and the deflection array elements in the second portion $708_{3B}$ of the third common wavelength region are respectively configured so that a first portion of the third wavelength channel $\lambda_3$ that is incident on the third common wavelength channel region $708_3$ is steered at a first steering angle $710_3$, and a second portion of the third wavelength channel $\lambda_3$ that is incident on the third common wavelength region $708_3$ is steered at a second steering angle $716_3$.

The respective steering angles $710_3$ and $716_3$ of the first and second portions $708_{3A}$ and $708_{3B}$ of the third common wavelength channel region $708_3$ are controllable by controlling phase shift profiles of the deflection array elements across the respective portions of the common wavelength region along the direction of the Y-axis. For example, a first phase shift profile 712 may be produced across the rows 702 of deflection array elements in the first portion $708_{3A}$ of common wavelength channel region $708_3$ to steer the first wavelength portion of the third wavelength channel $\lambda_3$ at the intended first steering angle $710_3$. A second phase shift profile 713 that may be produced across the rows 704 of deflection array elements in the second portion $708_{3B}$ of common wavelength channel region $708_3$ to steer the second wavelength portion of the third wavelength channel $\lambda_3$ at the intended second steering angle $716_3$.

The first and second phase shift profiles 712 and 713 produce first and second cumulative phase profiles 714 and 715 that provide first and second linear optical phase retardations in the direction of the intended first and second deflections, thereby steering the first and second portions of the third wavelength channel $\lambda_3$ at the intended steering angles $710_3$ and $716_3$, respectively.

Accordingly, by controlling the deflection elements in the first and second portions $708_{3A}$ and $708_{3B}$ of the third common wavelength channel region $708_3$ to adjust the first and second phase shift profiles 712 and 713, the first and second wavelength portions of the wavelength channel $\lambda_3$ can be independently steered, with the first wavelength portion being steered for wavelength selective switching purposes and the second portion not being used, or possibly being steered for monitoring purposes. For an adjacent wavelength channel, second and first wavelength portions of the wavelength channel can be similarly steered as the first and second wavelength portions by controlling the phase shift profiles of deflection elements in the respective second and first portions of the common wavelength region.

In some embodiments, each of the common wavelength channel regions $708_1$, $708_2$, $708_3$ may be controlled independently, allowing the first portions of the respective wavelength channels $\lambda_1$, $\lambda_2$, $\lambda_3$ incident thereupon to be independently steered for switching purposes.

Figure 8B:
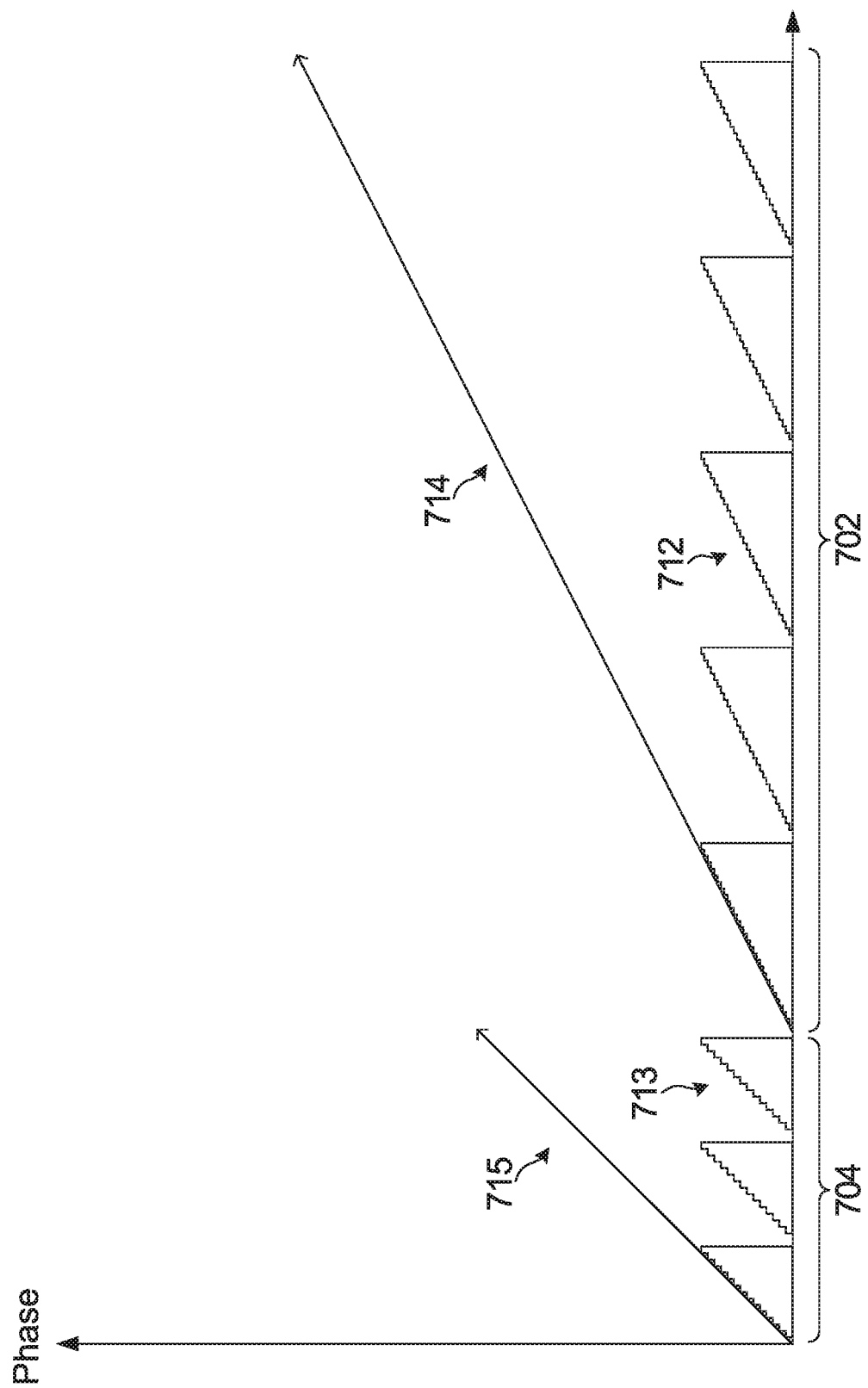
FIG. 8B is a plot showing the profiles of the two different phase progressions of the array shown in FIG. 7A.

For illustrative purposes, the phase shift profiles 712 and 713 appear as a series of periodic linear phase progressions across their respective portions $708_{3A}$ and $708_{3B}$ of the common wavelength region 708. However, in reality the phase shift profiles 712 and 713 have a periodic, stepped profile. FIG. 8B is a plot showing the periodic, stepped profiles 712 and 713 across the respective portions $708_{3A}$ and $708_{3B}$ of the array 700 shown in FIG. 8A.

In the example embodiment shown in FIG. 8A, each of the common wavelength channel regions $708_1$, $708_2$, $708_3$ is of equal size. Similarly, the respective first portions $708_{1A}$, $708_{2A}$, $708_{3A}$ are each of equal size and the respective second portions $708_{1B}$, $708_{2B}$, $708_{3B}$ are each of equal size. In other embodiments, common wavelength regions may be unequally sized, or may have differently sized first and second portions.

Furthermore, in some embodiments, the relative sizes of the first and second portions of a common wavelength region are adjustable. For example, the relative sizes of the first and second portions of a common wavelength region upon which a wavelength channel is incident may be configured such that the areas of the deflection array that are modified to steer the first or second wavelength portions in a common wavelength channel region do not overlap with a second or first wavelength portion in an adjacent common wavelength region.

The optical deflector array can be configured so that a substantially equal amount of the signal power of adjacent wavelength channels is incident on deflection elements that occupy a first portion of a first common wavelength channel region upon which a first wavelength channel is incident and deflection elements that occupy a second portion of a second common wavelength channel region upon which a second wavelength channel, which is adjacent the first wavelength channel, is incident. However, it is to be understood that while up to half of deflection elements of deflector array of a common wavelength channel region may be available to be modified when the optical power is spread substantially equally over the common wavelength channel region, it is possible that less than half of the deflection elements of a common wavelength channel region may be modified to deflect a portion of the beam incident on that portion of the common channel region.

The optical deflector array 700 may be an LCoS pixel array device, for example. More generally, embodiments of the present disclosure may employ any type of diffractive optical element that can be controlled to a) selectively steer first and second wavelength portions of each of one or more wavelength channels incident thereupon for switching purposes.

In the embodiment illustrated in FIG. 8A, the wavelength channels $\lambda_1$, $\lambda_2$, $\lambda_3$ each have an equal bandwidth and are equally spaced. However, embodiments are contemplated that support flex-grid compatibility, where at least one of channel bandwidths and spacings may be one or more of non-uniform and adaptable. For example, the relative sizes (in terms of at least one of a row and a column of at least one deflection element) and positions of the common wavelength channel regions $708_1$, $708_2$, $708_3$ can be adapted to accommodate at least one of a different channel bandwidth and a different channel spacing.

Figure 9:
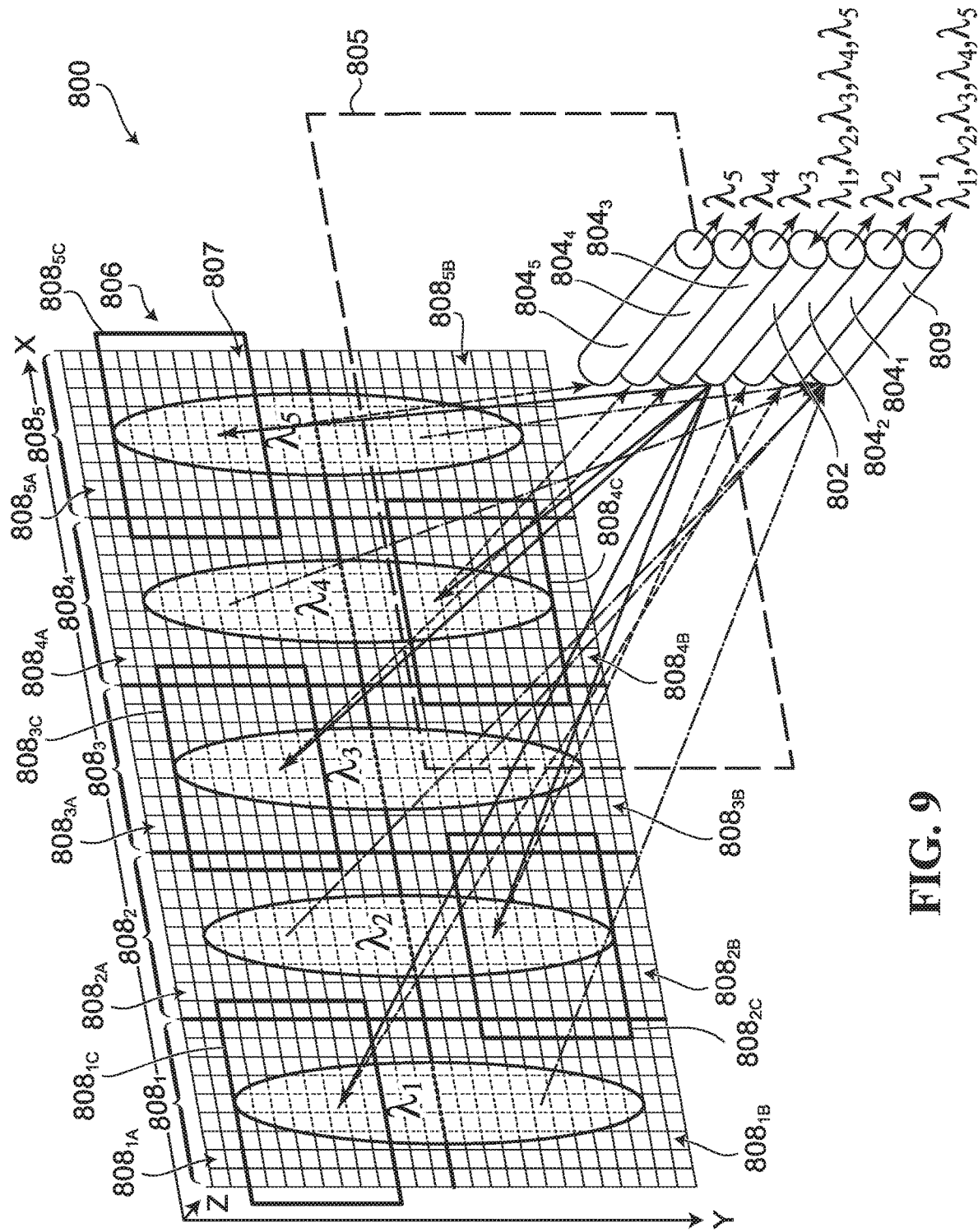
FIG. 9 is a diagram of a portion of an optical deflector array based 1×5 WSS according to an embodiment of the present disclosure.

FIG. 9 is a diagram of a portion of an optical deflector array based 1×5 WSS 800 according to an embodiment of the present disclosure. The optical deflector array based 1×5 WSS 800 includes an input port 802 receiving an optical signal comprising wavelengths channels $\lambda_1$, $\lambda_2$, $\lambda_3$, $\lambda_4$, $\lambda_5$, five output ports $804_1$, $804_2$, $804_3$, $804_4$, and $804_5$, a monitoring output port 809, and an optical deflector array 806. While the monitoring output port 809 is included in FIG. 8, the monitoring output port may not be included in all implementations. For example, if monitoring of the wavelength channels is not being performed, and the portions of the common wavelength channel regions that are not being routed to an output port are routed so as not to interfere with optical signals that are being routed, then a monitoring output port may not be included. The optical deflector array 806 includes a plurality of deflection elements 807 arranged in a two dimensional lattice in an X-Y plane of the optical deflector array.

The wavelength channels $\lambda_1$, $\lambda_2$, $\lambda_3$, $\lambda_4$, $\lambda_5$ of the incoming optical signal from the input port 802 are spatially separated and directed onto the controllable optical deflector array 806 by optics 805 (not shown in detail), which may be similar to the optics 405 of FIG. 4. In some implementations, the optics 805 may include an element for dividing one or more of the wavelength channels into at least two separate portions within a respective common wavelength region. Each wavelength channel $\lambda_1$, $\lambda_2$, $\lambda_3$, $\lambda_4$, $\lambda_5$ is incident on a respective common wavelength channel region $808_1$, $808_2$, $808_3$, $808_4$, $808_5$ of the optical deflector array 806. Each of the common wavelength channel regions $808_1$, $808_2$, $808_3$, $808_4$, $808_5$ has a first portion $808_{1A}$, $808_{2A}$, $808_{3A}$, $808_{4A}$, $808_{5A}$ and a second portion $808_{1B}$, $808_{2B}$, $808_{3B}$, $808_{4B}$, $808_{5B}$.

A first area $808_{1C}$ includes deflection elements of the first wavelength portion $808_{1A}$ of common wavelength channel region $808_1$ and deflection elements of the first wavelength portion $808_{2A}$ of common wavelength channel region $808_2$. A second area $808_{2C}$ includes deflection elements of the second wavelength portion $808_{2B}$ of common wavelength channel region $808_2$ and deflection elements of the second wavelength portion $808_{1B}$ of common wavelength channel region $808_1$ and deflection elements of the third wavelength portion $808_{3B}$ of common wavelength channel region $808_3$. A third area $808_{3C}$, a fourth area $808_{4C}$ and a fifth area $808_{5C}$ are similar to the first area $808_{1C}$ and the second area $808_{2C}$.

The first, third and fifth areas $808_{1C}$, $808_{3C}$, $808_{5C}$ are configurable to steer a first wavelength portion of the wavelength channel that is incident on the common wavelength channel region of each channel so that the first wavelength portion of the wavelength channel can be selectively routed to one of the switching output ports $804_1$, $804_3$, $804_5$. The second area $808_{1B}$, $808_{3B}$, $808_{5B}$ of the common wavelength regions $808_1$, $808_3$, $808_5$ is configurable to steer the wavelength channel that is incident on the common wavelength region so that the second area of the wavelength channel can be selectively routed to monitoring output port 809 or in a direction that it does not interfere with channels that are being routed to a particular port. The second and fourth areas $808_{2C}$, $808_{4C}$ are configurable to steer a second wavelength channel portion of the wavelength channel that is incident on the common wavelength regions so that the second wavelength portion of the wavelength channels can be selectively routed to one of the switching output ports $804_2$, $804_4$. The first area $808_{2A}$, $808_{4A}$ of each common wavelength region $808_2$, $808_4$ is configurable to steer the wavelength channel that is incident on the common wavelength region so that the second area of the wavelength channel can be selectively routed to monitoring output port 809 or in a direction that it does not interfere with channels that are being routed to a particular port.

For example, in the configuration illustrated in FIG. 9, the optical deflector array 806 is configured such that a first wavelength channel portion of each of the wavelength channels $\lambda_1$, $\lambda_3$, and $\lambda_5$ of the input signal is steered toward a respective one of the switching output ports 804$_1$, 804$_3$, and 804$_5$ and a second wavelength channel portion of each of the wavelength channels $\lambda_2$, $\lambda_4$ of the input signal is steered toward a respective one of the switching output ports 804$_2$, 804$_4$. In each case, the channel being steered is a result of modifying deflection elements that are part of the common wavelength channel region for a wavelength channel as well as deflection elements that are part of the common wavelength channel region of at least one adjacent wavelength channel.

Figure 10:
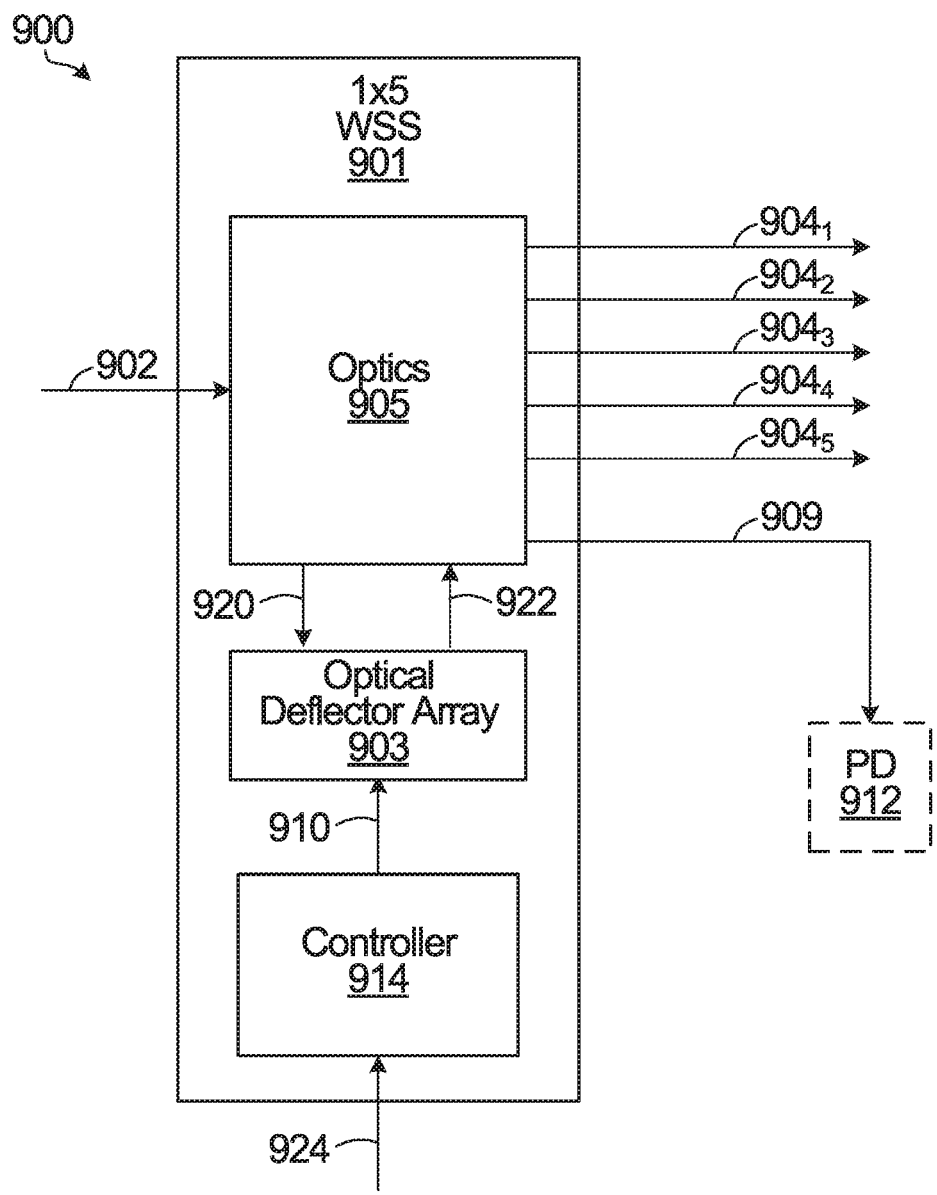
FIG. 10 is a block diagram of a 1×5 WSS with a single optical monitoring output port according to an embodiment of the present disclosure.

FIG. 10 is a block diagram of an apparatus 900 according to an embodiment of the present disclosure that includes a 1×5 WSS 901 with a single optical monitoring output port 909. In some implementations, the apparatus may optionally include a photodetector (PD) 912 (e.g., a photodiode) for optical performance monitoring. The 1×5 WSS 901 has a single optical switching input port 902, five optical switching output ports 904$_1$, 904$_2$, 904$_3$, 904$_4$, 904$_5$, the single optical monitoring output port 909 and a control input 924. PD 912, if included, is coupled to the optical monitoring output port 909 of 1×5 WSS 901.

The 1×5 WSS 901 includes optics 905, an optical deflector array 903 and a controller 914. Optics 905 are located between the optical switching input port 902 and the optical deflector array 903 and between the optical deflector array 903 and the optical switching output ports 904$_1$, 904$_2$, 904$_3$, 904$_4$, 904$_5$ and the optical monitoring output port 909. Optics 905 are configured to spatially separate wavelength channels of an optical signal received via the optical switching input port 902 and direct spatially separated wavelength channels 920 onto the optical deflector array 903. The optics 905 and the optical deflector array 903 may be implemented with components/technologies such as those described above. The optics 905 may include components similar to those of optics 405 shown in FIG. 4, for example. The optical deflector array 903 may be a LCoS pixel array device, for example.

The controller 914 may be implemented using any suitable electronic component/design, including analog components, digital components, or both.

The controller 914 is operatively coupled to the optical deflector array 903 at 910 and is configured to control the optical deflector array responsive to control signalling received via control input 924 so that the optical deflector array 903 steers the first and second portions of the wavelength channels as described above. The steered first and second portions of the wavelength channels are shown collectively as 922. Optics 905 multiplex the steered first and second wavelength channel portions of adjacent wavelength channels and direct them to an optical switching output port 904$_1$, 904$_2$, 904$_3$, 904$_4$, 904$_5$ according to the steering imparted to the first and second wavelength channel portions of the wavelength channels by the optical deflector array 903. Optics 905 ensure that the second and first wavelength portions of the wavelength channels do not interfere with the first and second wavelength portions of the wavelength channels, or possibly multiplex the steered second and first wavelength portions of the wavelength channels and direct them to the optical monitoring output port 909 according to the steering imparted to the second and first wavelength channel portions of the wavelength channels by the optical deflector array 903.

If included in apparatus 900, the PD 912 receives an optical signal that includes the second and first wavelength channel portions of the wavelength channels that are steered toward the optical monitoring output port 909 and converts the optical signal to an electrical signal. The PD 912 may be used to detect powers of single wavelength channels, or some wavelength channel combinations, for example. The electrical signal output of the PD 912 may serve as an input to subsequent signal processing components/circuits (not shown in FIG. 10) to implement further optical performance monitoring functions, such as determining optical signal to noise ratio, for example.

Figure 11:
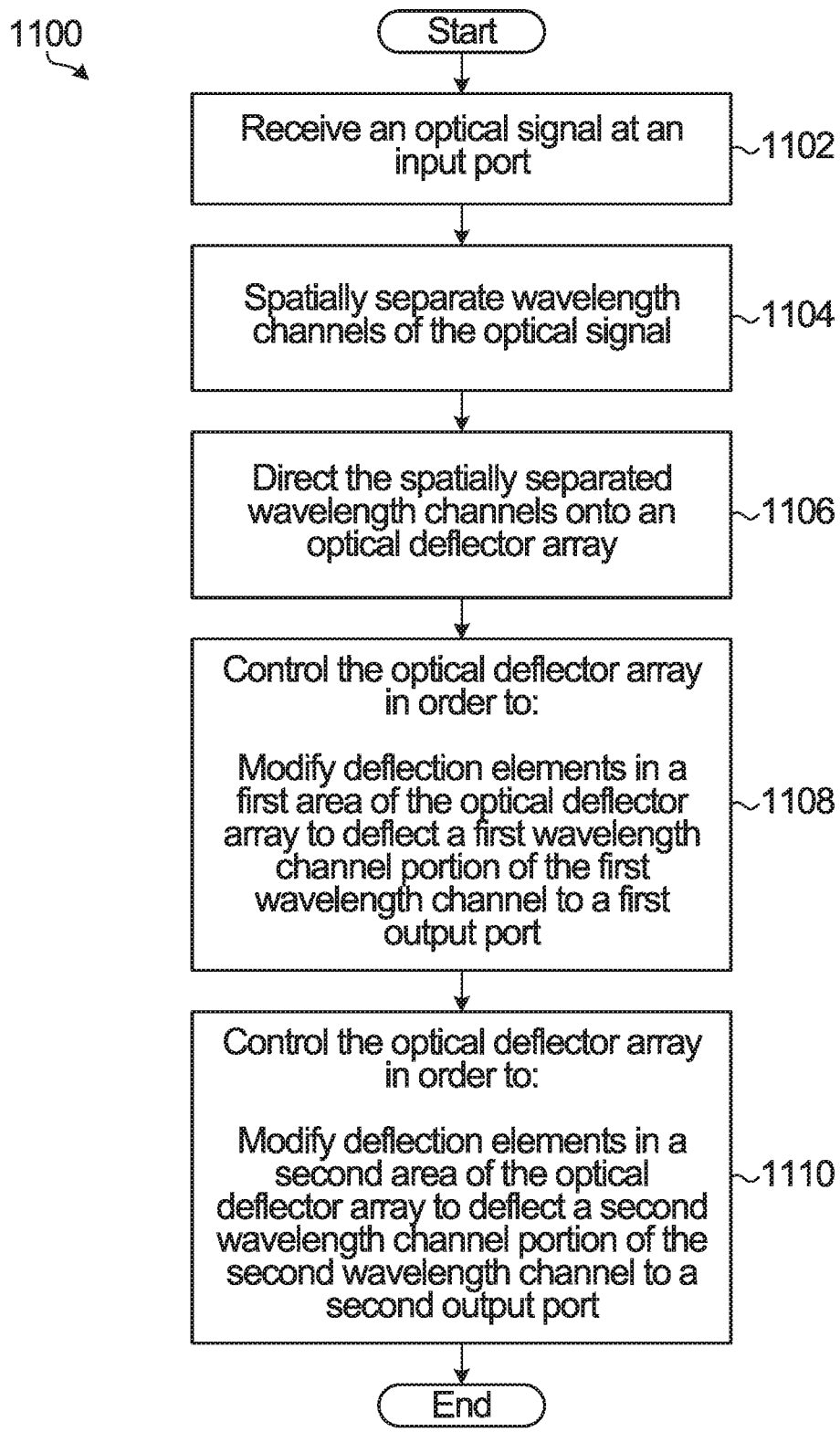
FIG. 11 is a flow diagram of example operations in an apparatus according to example embodiments described herein.

FIG. 11 is a flow diagram of example operations 1100 in an apparatus according to example embodiments described herein. Operations 1100 may be indicative of operations occurring in a WSS that is part of an access ROADM node in a DWDM optical network, for example.

Operations 1100 begin with the apparatus receiving an optical signal at an input port (block 1102).

Wavelength channels of the optical signal are spatially separated (block 1104). The spatial separation of the wavelength channels may be accomplished using a diffractive grating or any other type of dispersive optical element that is capable of spatially separating the wavelength channels of the optical signal.

The spatially separated wavelength channels are directed onto an optical deflector array (block 1106). The optical deflector array is a two dimensional lattice of deflection elements. The two dimensional lattice of deflection elements extends in a first direction along a wavelength dispersion axis and in a second direction along a second axis perpendicular to the wavelength dispersion axis. The direction of the spatially separated wavelength channels may involve at least one of reflection by one or more mirrors and focusing by one or more lenses, for example.

The optical deflector array is controlled in order to modify deflection elements in a first area of the optical deflector array to deflect a first wavelength channel portion of the first wavelength channel to a first output port (1108). The first area includes deflection elements from a first portion of the common wavelength region of the first wavelength channel and from a first portion of the common wavelength region of the second wavelength channel.

The optical deflector array is also controlled to modify deflection elements in a second area of the optical deflector array to deflect a second wavelength channel portion of the second wavelength channel to a second output port (1110). The second area includes deflection elements from a second portion of the common wavelength region of the second wavelength channel and from a second portion of the common wavelength region of the first wavelength channel.

The example operations 1100 are illustrative of an example embodiment. Various ways to perform the illustrated operations, as well as examples of other operations that may be performed, are described herein. Further variations may be or become apparent.

Referring back to FIG. 2, aspects of the present disclosure can be implemented in such an architecture. While it would be possible to configure both the Route WSS and Select WSS in a given ROADM node based on the above description, beneficial results may be obtained by configuring the Route WSS in a manner consistent with embodiments described in the present disclosure to have a wider passband, such as shown in FIG. 7B, and using a normal configuration, such as shown in FIG. 7A, or at least a manner that is limited to the boundaries of the common wavelength channel regions, and not overlapping into common wavelength channel regions of adjacent channels, in the Select WSS.

As the deflector array is programmable, it is to be understood that the size of the areas of deflection elements defined above that result in a wider passband response for a given channel, could be defined by the controller to be as narrow as the common wavelength channel region for a wavelength channel, which would thereby result in normal width passband response. Similarly, in some implementations, the controller could include deflection elements from a common wavelength channel region of one adjacent channel, but not the other, as will be described in further detail below with reference to the example shown in FIG. 13B. As such, there can be a mixture of wider passband channels and normal width passband channels within the same WSS.

Figure 12A:
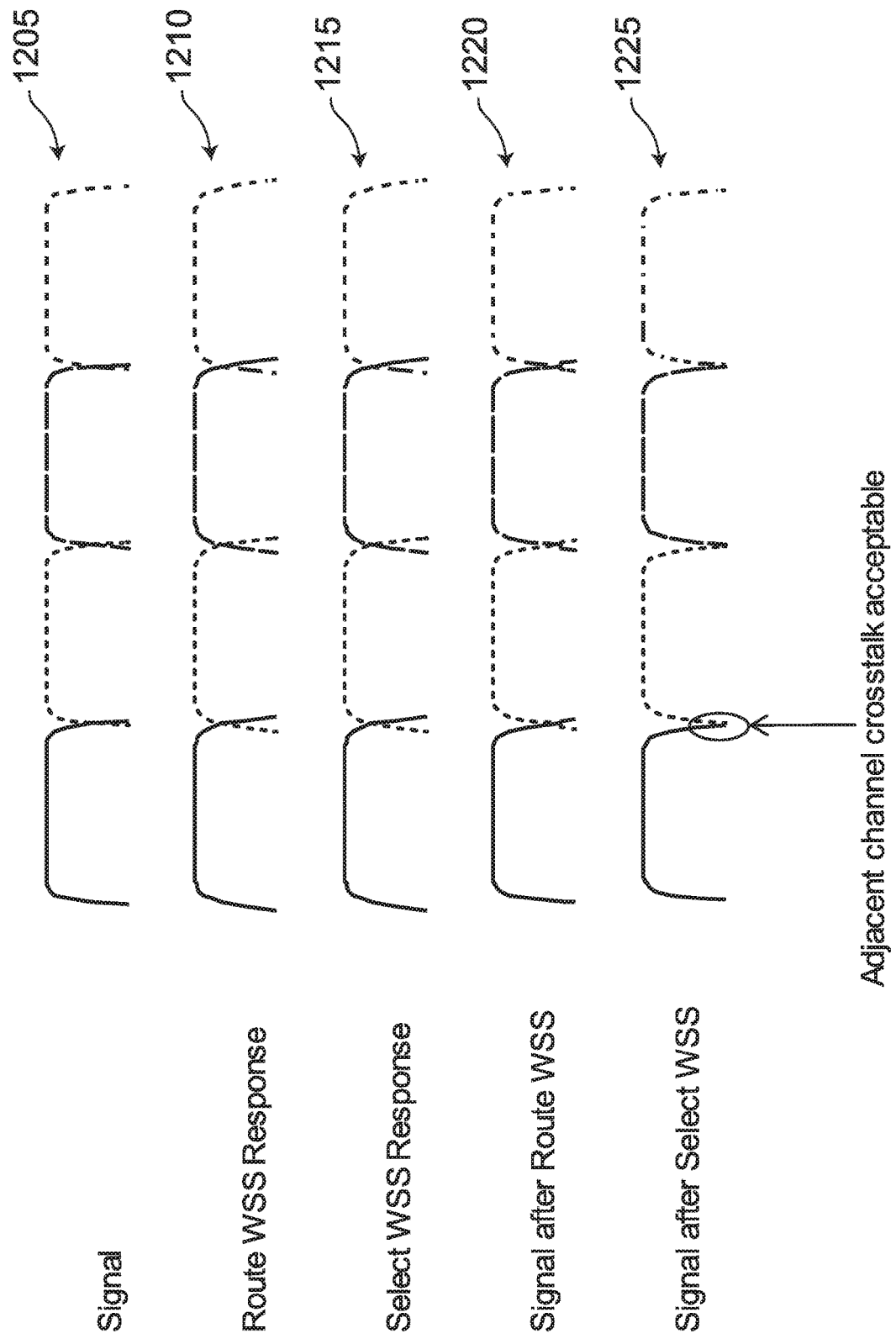
FIG. 12A is a diagram illustrating signal bandwidths on four channels, passband bandwidths for Route and Select WSS for the respective channels and responses after the signals have passed through the Route and Select WSS.

FIG. 12A illustrates an example of adjacent channel crosstalk for four channels for a situation where a Route WSS in a first node uses a normal width passband configuration and a Select WSS in a second node uses a normal configuration. FIG. 12A shows an example of the signal 1205 that might be applied to the Route WSS on each channel. FIG. 12A also shows an example of the passband response 1210 for each channel of the Route WSS and an example of the passband response 1215 for each channel of the Select WSS. FIG. 12A further shows an example of the signal 1220 for each channel at the output of the Route WSS and an example of the signal 1225 for each channel at the output of the Select WSS. As can be seen the signal 1225 has acceptable crosstalk.

Figure 12B:
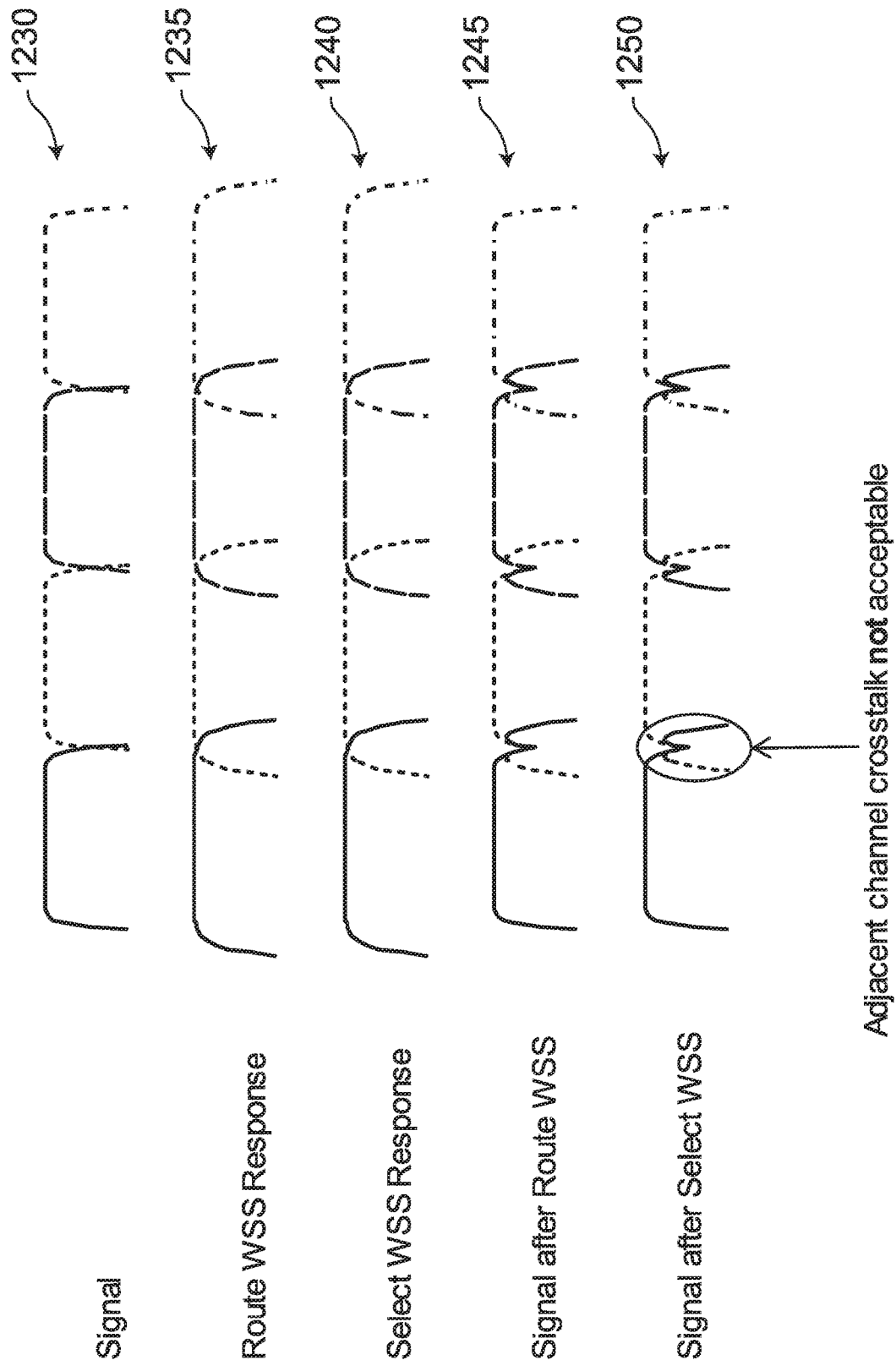
FIG. 12B is a diagram illustrating signal bandwidths on four channels, passband bandwidths for Route and Select WSS for the respective channels configured according to an aspect of the disclosure and responses after the signals have passed through the Route and Select WSS.

FIG. 12B illustrates an example of adjacent channel crosstalk for four channels for a situation where a Route WSS in a first node uses a wide passband configuration and a Select WSS in a second node uses a wide passband configuration. FIG. 12B shows an example of the signal 1230 that might be applied to the Route WSS on each channel. FIG. 12B also shows an example of the passband response 1235 for each channel of the Route WSS and an example of the passband response 1240 for each channel of the Select WSS. FIG. 12B further shows an example of the signal 1245 for each channel at the output of the Route WSS and an example of the signal 1250 for each channel at the output of the Select WSS. As can be seen, the crosstalk of adjacent channels of signal 1250 is not acceptable.

Figure 12C:
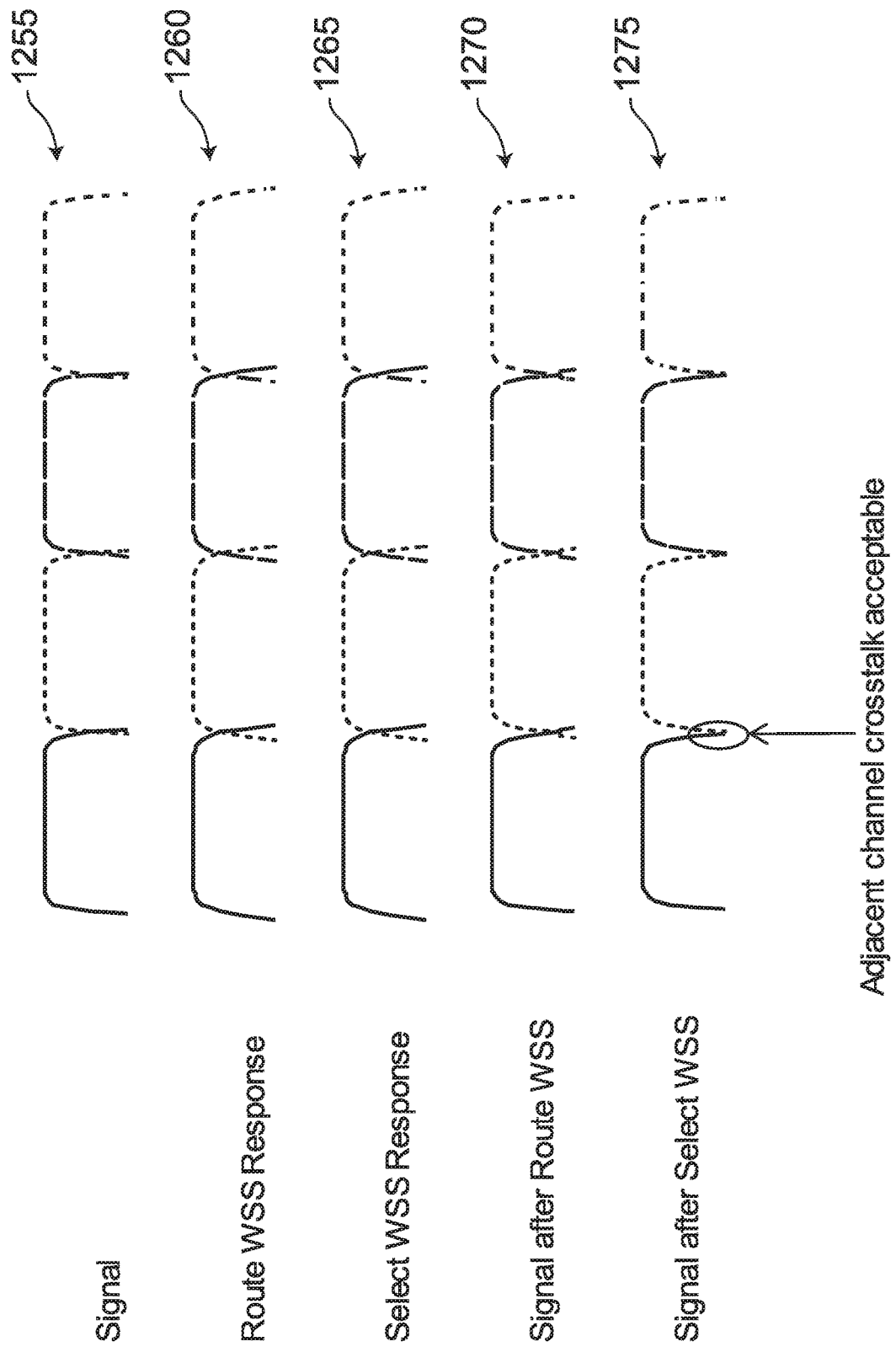
FIG. 12C is a diagram illustrating signal bandwidths on four channels, passband bandwidths for a Route WSS configured according to an aspect of the disclosure and a Select WSS for the respective channels and responses after the signals have passed through the Route and Select WSS.

FIG. 12C illustrates an example of adjacent channel crosstalk for four channels for a situation where a Route WSS in a first node uses a wide passband configuration and a Select WSS in a second node uses a regular configuration. FIG. 12C shows an example of the signal 1255 that might be applied to the Route WSS on each channel. FIG. 12C also shows an example of the passband response 1260 for each channel of the Route WSS and an example of the passband response 1265 for each channel of the Select WSS. FIG. 12C further shows an example of the signal 1270 for each channel at the output of the Route WSS and an example of the signal 1275 for each channel at the output of the Select WSS. As can be seen the signal 1275 has acceptable crosstalk.

Figure 13A:
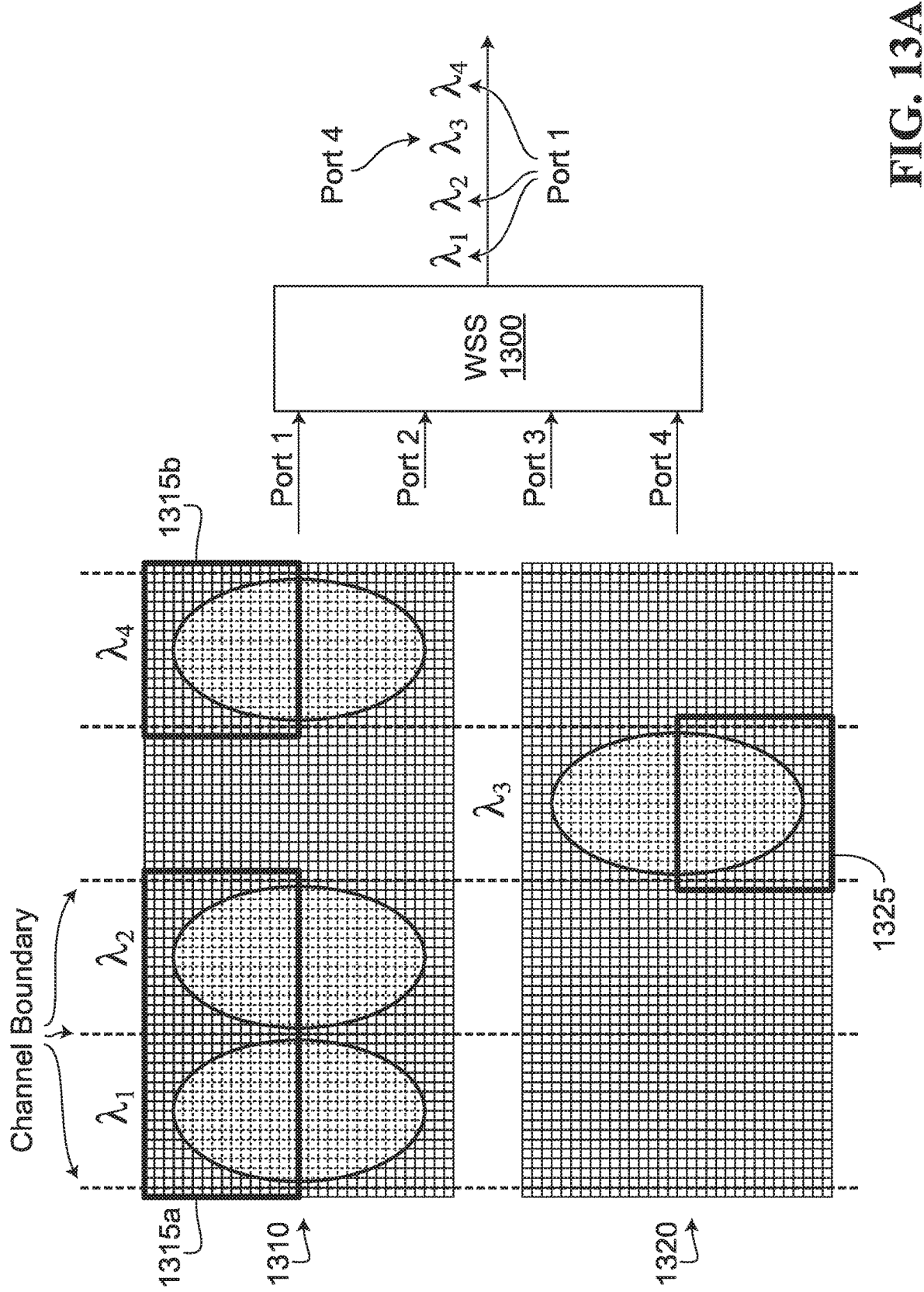
FIG. 13A is a diagram of an example 4 port WSS and optical deflector arrays for two of the ports, the optical deflector arrays configured to operate according to as aspect of the disclosure.

FIG. 13A illustrates an example for a multiplexing operation that may be part of a Select WSS 1300. The Select WSS 1300 has four input ports and one output port. The input to Port 1 of the Select WSS 1300 is provided an optical signal with three wavelengths, $\lambda_1$, $\lambda_2$, and $\lambda_4$. The input to Port 4 of the Select WSS 1300 is provided an optical signal with a single wavelength, $\lambda_3$. At the output port, the three wavelengths from Port 1 and the single wavelength from Port 4 are combined. FIG. 13A includes a representation of the three wavelengths from Port 1 incident on a deflector array 1310 and a representation of the single wavelength from Port 4 incident on a deflector array 1320. While the wavelength channels of the optical signals from the different ports are incident on the same common wavelength channel regions of a same deflector array, for the purposes of this example, the beams of the two ports are shown separately.

As shown in FIG. 9, the input ports of the WSS are physically spaced apart from one another, which results in the beams of the same wavelength channel from different ports being incident on the deflection elements in the common channel wavelength region at different angles. Therefore, it is possible to modify the deflection elements in a common wavelength channel region so that a beam from one port can be steered to an output port and a beam from a different port of the same wavelength can be steered in a direction away from the output port. Therefore, the light from one port steered to the output port is passed and the light from the different port is steered away from the output port and is effectively blocked or filtered out.

As described above, the optical signal from Port 1 is spread over common wavelength channel regions for $\lambda_1$, $\lambda_2$ and $\lambda_4$ and the optical signal from Port 4 is spread over a common wavelength channel region for $\lambda_3$. To enable some of the channels to have a wider passband, it is possible to use the deflection elements of a first portion of the common wavelength channel regions for a first input port to steer the beams to the output port and use the deflection elements of a second portion of the common wavelength channel regions for a second input port to steer the beams to the output port, where the first and second portions do not overlap. In such an implementation, for one or more channels, an area in either the first or second portion may be comprised of deflection elements from a common wavelength channel region of multiple wavelength channels, as described above.

In the example of FIG. 13A, this is seen as the top half of the deflector array 1310 being the portion of deflection elements used for steering beams from Port 1 and the bottom half of the deflector array 1320 being the portion of the deflection elements used for steering beams from Port 4. Because Port 1 does not include a beam on $\lambda_3$ and Port 4 has a beam only on $\lambda_3$, the areas of deflection elements that are modified in the first portion of $\lambda_2$ for Port 1 can include deflection elements from common wavelength channel regions of $\lambda_2$ and $\lambda_3$ and the first portion of $\lambda_4$ for Port 1 can include deflection elements from common wavelength channel regions of $\lambda_4$ and $\lambda_3$. Similarly, the areas of deflection elements that are modified in the second portion of $\lambda_3$ for Port 4 can include deflection elements from common wavelength channel region of $\lambda_3$ as well as both $\lambda_2$ and $\lambda_4$.

On deflector array 1310, the area of deflection elements selected to be modified are shown by 1315a and 1315b. On deflector array 1320, the area of deflection elements selected to be modified are shown by 1325. For adjacent wavelengths, the area of the modified deflection elements ends at the edge of the common wavelength channel region or the wavelength channel boundary, to avoid crosstalk of adjacent channels. However, if there is no adjacent channel, the area of modified deflection elements can expand into the adjacent common wavelength channel region. For example, the common wavelength channel region for each of the wavelength is 16 pixels wide. With regard to Port 1, for $\lambda_1$, as there is no adjacent channel on the left side of the deflector array, the area of modified deflection elements may extend one or more pixels in that direction to provide a wider passband for wavelength channel $\lambda_1$. Again with regard to Port 1, for $\lambda_2$, as there is no beam on adjacent wavelength channel $\lambda_3$, the area of modified deflection elements may extend one or more pixels in that direction to provide a wider passband response for wavelength channel $\lambda_2$. Again with regard to Port 1, for $\lambda_4$, as there is no beam on adjacent wavelength channel $\lambda_3$ and there is no adjacent channel on the right side of the deflector array, the area of modified deflection elements may extend one or more pixels in both directions to provide a wider passband response for wavelength channel $\lambda_4$. With regard to Port 4, for $\lambda_3$, as there is no beam on adjacent wavelength channels $\lambda_2$ and $\lambda_4$, the area of modified deflection elements may extend one or more pixels in both directions to provide a wider passband response for wavelength channel $\lambda_3$.

Figure 13B:
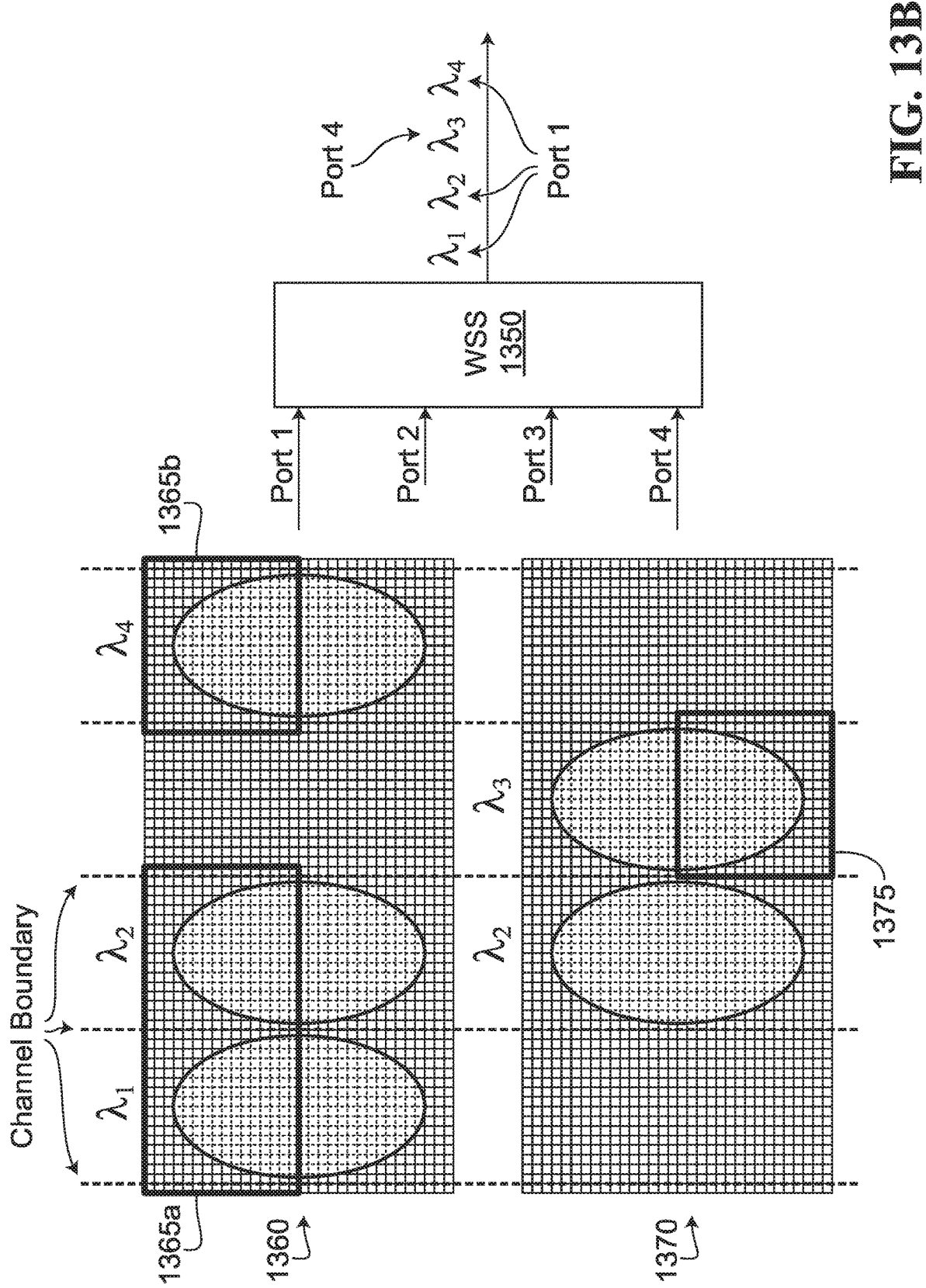
FIG. 13B is a diagram of another example 4 port WSS and optical deflector arrays for two of the ports, the optical deflector arrays configured to operate according to as aspect of the disclosure.

FIG. 13B illustrates another example for a multiplexing operation that may be part of a Select WSS 1350. The Select WSS 1350 is similar to WSS 1300 from FIG. 13A in that it includes four input ports and one output port. The input to Port 1 of the Select WSS 1350 is provided an optical signal with three wavelengths, $\lambda_1$, $\lambda_2$, and $\lambda_4$. The input to Port 4 of the Select WSS 1350 is provided an optical signal with two wavelengths $\lambda_2$ and $\lambda_3$. At the output port the desired output is that the three wavelengths from Port 1 and only wavelength $\lambda_3$ from Port 4 are combined. Therefore, only $\lambda_3$ from Port 4 is to be combined with the other wavelengths from Port 1 and wavelength $\lambda_2$ from Port 4 is filtered out. FIG. 13B includes a representation of the three wavelengths from Port 1 incident on a deflector array 1360 and a representation of the two wavelengths from port 4 incident on a deflector array 1370. While the wavelength channels of the optical signals from the different ports are incident on the same common wavelength channel regions of a same deflector array, for the purposes of this example the beams of the two ports are shown separately.

In FIG. 13B the optical signal from Port 1 is spread over common wavelength channel regions for $\lambda_1$, $\lambda_2$ and $\lambda_4$ and the optical signal from Port 4 is spread over common wavelength channel regions for $\lambda_2$ and $\lambda_3$.

On deflector array 1360, the area of deflection elements selected to be modified are shown by 1365a and 1365b. On deflector array 1370, the area of deflection elements selected to be modified are shown by 1375. With regard to Port 1, for $\lambda_1$, as there is no adjacent channel on the left side of the deflector array, the area of modified deflection elements may extend one or more pixels in that direction to provide a wider passband response for wavelength channel $\lambda_1$. Again with regard to Port 1, for $\lambda_2$, as there is no beam on adjacent wavelength channel $\lambda_3$, the area of modified deflection elements may extend one or more pixels in that direction to provide a wider passband for wavelength channel. The wavelength channel $\lambda_2$ beam from Port 4 is also incident upon the same common wavelength channel region of the deflector array in a practical implementation. As described above, because the beam for $\lambda_2$ from Port 4 is incident at a different angle upon the deflection elements of the common wavelength channel region for wavelength channel $\lambda_2$, only the wavelength channel $\lambda_2$ beam from Port 1 is directed to the output port and the wavelength channel $\lambda_2$ beam from Port 4 is dropped as it is not directed to the output port. Again with regard to Port 1, for $\lambda_4$, as there is no beam on adjacent wavelength channel $\lambda_3$ and there is no adjacent channel on the right side of the deflector array, the area of modified deflection elements may extend one or more pixels in both directions to provide a wider passband response for that wavelength channel. With regard to Port 4, for $\lambda_3$, as there is a beam on adjacent wavelength channel $\lambda_2$ that needs to be filtered out, the area of modified deflection elements is not extended into the common wavelength region of $\lambda_2$ as doing so would result in crosstalk between wavelength channel $\lambda_2$ that would be allowed to pass through the wider passband into wavelength channel $\lambda_3$ on port 4 and the beam on wavelength channel $\lambda_2$ on port 1. However, as there is no beam on adjacent wavelength channel $\lambda_4$, the area of modified deflection elements may extend one or more pixels in that direction to provide a wider passband on that side for wavelength channel $\lambda_3$.

General rules for determining whether a wider bandwidth can be tolerated for a given channel when multiple ports are included in the Select WSS are described below.

Considering a wavelength channel $\lambda_i$ from Port A and a wavelength channel $\lambda_{i+1}$ from Port B, if there is a signal on wavelength channel $\lambda_i$ on Port A and a signal on wavelength channel $\lambda_i$ on Port B, then the left side passband of wavelength channel $\lambda_{i+1}$ from Port B must be normal and not wide.

Considering a wavelength channel $\lambda_i$ from Port A and a wavelength channel $\lambda_{i-1}$ from Port B, if there is a signal on wavelength channel $\lambda_i$ on Port A and a signal on wavelength channel $\lambda_i$ on Port B, then the right side passband of channel $\lambda_{i-1}$ from Port B must be normal and not wide.

Numerous modifications and variations of the present application are possible in light of the above teachings. It is therefore to be understood that within the scope of the appended claims, the application may be practiced otherwise than as specifically described herein.

In addition, although described primarily in the context of methods, apparatus and equipment, other implementations are also contemplated, such as in the form of instructions stored on a non-transitory computer-readable medium, for example.

I claim:

1. A method of providing a wider channel passband for a wavelength selective switch (WSS), the method comprising:
spatially separating an optical signal comprising at least one wavelength channel onto an optical deflector array comprising a plurality of deflection elements, each of the at least one wavelength channel defined on the optical deflector array by a respective common wavelength channel region;
modifying deflection elements in a first area of the optical deflector array in accordance with a single phase shift profile to deflect a first wavelength channel portion of a first wavelength channel to a first output port, the first area including deflection elements from a first portion of the common wavelength channel region of the first wavelength channel and from a first portion of the common wavelength channel region of a second wavelength channel adjacent the first portion of the common wavelength channel region of the first wavelength channel,
wherein deflection elements in the first area are non-overlapping with deflection elements of a second area of the optical deflector array configured to deflect a second wavelength channel portion of a second wavelength channel to a second output port in accordance with a single phase shift profile, the second area including deflection elements from a second portion of the common wavelength channel region of the second wavelength channel and from a second portion of the common wavelength channel region of the first wavelength channel adjacent the second portion of the common wavelength channel region of the second wavelength channel,
wherein the first and second wavelength channels are distinct from one another.

2. The method of claim 1, the method further comprising modifying deflection elements in the second area of the optical deflector array to deflect the second wavelength channel portion of the second wavelength channel to the second output port, the second area including deflection elements from the second portion of the common wavelength channel region of the second wavelength channel and from the second portion of the common wavelength channel region of the first wavelength channel adjacent the second portion of the common wavelength channel region of the second wavelength channel.

3. The method of claim 2, wherein:
for a multiplexing WSS the first output port and the second output port are the same output port; and
for a demultiplexing WSS the first output port and the second output port are different output ports.

4. The method of claim 2, further comprising:
receiving the optical signal at an input port;
spatially separating two adjacent wavelength channels of the optical signal; and
directing the two spatially separated adjacent wavelength channels onto the optical deflector array so that each wavelength channel is incident on its respective common wavelength channel region of the optical deflector array.

5. The method of claim 2 further comprising, for a third wavelength channel adjacent the second wavelength channel:
modifying deflection elements in a third area of the optical deflector array in accordance with a single phase shift profile to deflect a first wavelength channel portion of a third wavelength channel to a third output port, the third area including deflection elements from a first portion of the common wavelength channel region of the third wavelength channel and from a first portion of the common wavelength channel region of the second wavelength channel, wherein the first, second and third wavelength channels are distinct from one another; and
modifying deflection elements in the second area of the optical deflector array in accordance with a single phase shift profile, the second area also including deflection elements from a second portion of the common wavelength channel region of the third wavelength channel, wherein the deflection elements in the second area and the deflection elements in the third area are non-overlapping.

6. The method of claim 2, wherein:
the deflection elements are arranged in a two dimensional lattice; and
controlling the optical deflector array comprises controlling phase shift profiles of the deflection elements in the first and second areas of the optical deflector array.

7. The method of claim 6, wherein controlling phase shift profiles of the deflection elements in the first and second areas of the optical deflector array comprises controlling the optical deflector array so that:
deflection elements in the first area of the optical deflector array have a first phase shift profile; and
deflection elements in the second area of the optical deflector array have a second phase shift profile.

8. The method of claim 7, wherein:
the two dimensional lattice of deflection elements extends in a first direction along a wavelength dispersion axis and in a second direction along a second axis perpendicular to the wavelength dispersion axis; and the phase shift profiles are along the direction of the second axis.

9. The method of claim 8, wherein the common wavelength channel region of each wavelength channel comprises a predefined number of columns of deflection elements in the first direction that collectively correspond to a predefined bandwidth.

10. The method of claim 9, wherein:
a first portion of the common wavelength channel region of the second wavelength channel includes n columns of deflection elements in the first direction, where n is an integer number ≤10% of the predefined number of deflection elements in the common wavelength channel region of the first wavelength channel; and
a second portion of the common wavelength channel region of the first wavelength channel includes m columns of deflection elements in the first direction, where m is an integer number ≤10% of the predefined number of deflection elements in the common wavelength channel region of the second wavelength channel.

11. The method of claim 1, wherein the optical deflector array is a liquid crystal on silicon (LCoS) pixel array.

12. The method of claim 2 further comprising:
modifying deflection elements in a first wavelength channel portion of the second wavelength channel to a first monitoring output port; and
modifying deflection elements in a second wavelength channel portion of the first wavelength channel to a second monitoring port.

13. A method of providing a wider channel passband for a wavelength selective switch (WSS), the method comprising:
spatially separating a first optical signal received from a first input port comprising at least one wavelength channel onto an optical deflector array comprising a plurality of deflection elements, each wavelength channel defined on the optical deflector array by a common wavelength channel region;
spatially separating a second optical signal received from a second input port comprising two adjacent wavelength channels onto the optical deflector array, wherein one wavelength channel of the two adjacent wavelength channels is the same as one of the at least one wavelength channel of the first optical signal and the adjacent wavelength channel of the two adjacent wavelength channels is different than any of the at least one wavelength channels of the first optical signal;
modifying deflection elements in a first area of the optical deflector array in accordance with a single phase shift profile to deflect a first wavelength channel portion of a first wavelength channel from the first optical signal to an output port, while deflecting the first wavelength channel portion of the first wavelength channel from the second optical signal somewhere other than the output port due at least in part to spacing of the first and second input ports, the first area including deflection elements from a first portion of the common wavelength channel region of the first wavelength channel and from a first portion of the common wavelength channel region of a second wavelength channel;
modifying deflection elements in a second area of the optical deflector array configured to deflect a second wavelength channel portion of the second wavelength channel from the second optical signal to the output port in accordance with a single phase shift profile, the second area including deflection elements from a second portion of the common wavelength channel region of the second wavelength channel and from a second portion of the common wavelength channel region of a third wavelength channel;

wherein the first, second and third wavelength channels are distinct from one another.

14. An apparatus comprising:

at least one output port;

an optical deflector array comprising a plurality of deflection elements configured to receive incident thereupon at least one spatially separated optical signal comprising at least one wavelength channel, each of the at least one wavelength channel being incident on a respective common wavelength channel region of the optical deflector array; and a controller operatively coupled to the optical deflector array and configured to control the optical deflector array in order to:

modify deflection elements in a first area of the optical deflector array in accordance with a single phase shift profile to deflect a first wavelength channel portion of the first wavelength channel to a first output port, the first area including deflection elements from a first portion of the common wavelength channel region of the first wavelength channel and from a first portion of the common wavelength channel region of a second wavelength channel, wherein the first and second wavelength channels are distinct from one another;

modify deflection elements in a second area of the optical deflector array in accordance with a single phase shift profile to deflect a second wavelength channel portion of the second wavelength channel to a second output port, the second area including deflection elements from a second portion of the common wavelength channel region of the second wavelength channel and from a second portion of the common wavelength channel region of the first wavelength channel adjacent the second portion of the common wavelength channel region of the second wavelength channel, wherein the deflection elements in the first area and the deflection elements in the second area are non-overlapping.

15. The apparatus of claim 14, wherein:

for a multiplexing apparatus the first output port and the second output port are the same output port; and for a demultiplexing apparatus the first output port and the second output port are different output ports.

16. The apparatus of claim 14, further comprising:

an input port to receive the optical signal; and optics located between the input port and the optical deflector array and configured to:

spatially separate two adjacent wavelength channels of the optical signal; and direct the two spatially separated adjacent wavelength channels onto the optical deflector array so that each wavelength channel is incident on its respective common wavelength channel region of the optical deflector array.

17. The apparatus of claim 14, wherein the deflection elements are arranged in a two dimensional lattice and the controller is configured to control the optical deflector array by controlling phase shift profiles of the deflection elements in the first and second areas of the optical deflector array.

18. The apparatus of claim 17, wherein the controller is configured to control phase shift profiles of deflection elements in the first and second areas of the optical deflector array so that:

deflection elements in the first area of the optical deflector array have a first phase shift profile; and deflection elements in the second area of the optical deflector array have a second phase shift profile.

19. The apparatus of claim 18, wherein:

the two dimensional lattice of deflection elements extends in a first direction along a wavelength dispersion axis and in a second direction along a second axis perpendicular to the wavelength dispersion axis; and the phase shift profiles are along the direction of the second axis.

20. The apparatus of claim 14, wherein the optical deflector array is a liquid crystal on silicon (LCoS) pixel array.

21. A wavelength selective switch (WSS) comprising the apparatus of claim 14.

* * * * *